United States Patent
Takatori

(10) Patent No.: US 8,108,889 B2
(45) Date of Patent: Jan. 31, 2012

(54) DIGITAL TELEVISION RECEIVER MODULE AND DIGITAL TELEVISION RECEIVER USING THE SAME

(75) Inventor: Masahiro Takatori, Osaka (JP)

(73) Assignee: Panasonic Corporation, Osaka (JP)

( * ) Notice: Subject to any disclaimer, the term of this patent is extended or adjusted under 35 U.S.C. 154(b) by 916 days.

(21) Appl. No.: 10/572,631

(22) PCT Filed: Sep. 21, 2004

(86) PCT No.: PCT/JP2004/013741
§ 371 (c)(1), (2), (4) Date: Oct. 12, 2006

(87) PCT Pub. No.: WO2005/029849
PCT Pub. Date: Mar. 31, 2005

(65) Prior Publication Data
US 2007/0056017 A1    Mar. 8, 2007

(30) Foreign Application Priority Data
Sep. 19, 2003   (JP) ................................. 2003-327788

(51) Int. Cl.
*H04N 7/16* (2011.01)
*H04N 5/44* (2011.01)
*H04N 5/46* (2006.01)
(52) U.S. Cl. ......................... 725/25; 380/553; 380/555
(58) Field of Classification Search .................. 725/132; 348/553–555
See application file for complete search history.

(56) References Cited

U.S. PATENT DOCUMENTS

| | | | | |
|---|---|---|---|---|
| 4,169,659 | A * | 10/1979 | Marlowe | 348/524 |
| 6,340,997 | B1 * | 1/2002 | Borseth | 348/731 |
| 6,347,399 | B1 | 2/2002 | Paskins | |
| 6,470,284 | B1 * | 10/2002 | Oh et al. | 702/64 |

(Continued)

FOREIGN PATENT DOCUMENTS

EP    0 982 692    3/2000

(Continued)

OTHER PUBLICATIONS

European Standard EN50221,"*Common Interface Specification for Conditional Access and other Digital Video Broadcasting Decoder Applications*", English version, Ref. No. EN50221:1996E, Feb. 1997, pp. 1-86.

(Continued)

*Primary Examiner* — Brian Pendleton
*Assistant Examiner* — Jean D Saint Cyr
(74) *Attorney, Agent, or Firm* — Wenderoth Lind & Ponack, L.L.P.

(57) ABSTRACT

A DTV module includes a CPU, a decoder, and a CA interface circuit. The decoder executes a decoding processing on a digital television signal inputted from a demodulator provided on a motherboard, so as to decode the digital television signal into a video signal and an audio signal, and outputs the video signal and audio signal. The CA interface circuit is connected to a CA module via a PC card socket, and executes input and output processings on signals communicated among the demodulator, CA module, decoder, and CPU. The CPU controls the CA interface circuit by switching types of the signals, so that a selected type of signal conforms to a type of the CA module, in response to a broadcasting system of a digital television signal or the type of the connected CA module.

20 Claims, 22 Drawing Sheets

U.S. PATENT DOCUMENTS

| | | | |
|---|---|---|---|
| 6,516,357 B1 | 2/2003 | Hamann et al. | |
| 6,516,465 B1 * | 2/2003 | Paskins | 725/25 |
| 6,603,080 B2 * | 8/2003 | Jensen | 174/255 |
| 6,690,797 B1 | 2/2004 | Vito et al. | |
| 6,985,188 B1 * | 1/2006 | Hurst, Jr. | 348/553 |
| 2002/0124193 A1 * | 9/2002 | Colman | 713/300 |
| 2002/0184425 A1 | 12/2002 | Miller-Smith | |
| 2003/0012377 A1 * | 1/2003 | Guenebaud | 380/239 |
| 2004/0228175 A1 * | 11/2004 | Candelore et al. | 365/158 |
| 2005/0088255 A1 * | 4/2005 | Sengupta et al. | 333/174 |

FOREIGN PATENT DOCUMENTS

| | | |
|---|---|---|
| JP | 11-331801 | 11/1999 |
| JP | 2000-36820 | 2/2000 |
| JP | 2002-300506 | 10/2002 |
| JP | 2003-511917 | 3/2003 |
| JP | 2003-515286 | 4/2003 |
| JP | 2003-518668 | 6/2003 |
| WO | 00/59210 | 10/2000 |
| WO | 01/06443 | 1/2001 |
| WO | 01/26372 | 4/2001 |
| WO | 01/37546 | 5/2001 |
| WO | 01/47267 | 6/2001 |
| WO | 02/35829 | 5/2002 |
| ZA | 2002/4489 | 6/2003 |

OTHER PUBLICATIONS

American National Standard ANSI/SCTE28 2001 (Formerly DVS 295), "*Host-POD Interface Standard*", Engineering Committee Digital Video Subcommittee, Society of Cable Telecommunications Engineers, 2001, pp. i-vii and 1-171.

ISO7816-1 Standard, "*Asynchronous smartcard information*", Version 1.00, last revised on Jun. 12, 1995, pp. 1-34.

PC Card Standard, vol. 2, "*Electrical Specification*", PCMCIA/JEITA, 2001, pp. i-xxii and 1-274.

SCTE40 2001 (Formerly DVS 313) "*Digital Cable Network Interface Standard*", Society of Cable Communications Engineers, pp. i-11 and 1-26.

Supplementary European Search Report issued Nov. 5, 2008 in the European Application No. 0478 7924.2.

Notification of Transmittal of Translation of the International Preliminary Report on Patentability dated Jul. 6, 2006 for International Application No. PCT/JP2004/013741.

Notification Concerning Transmittal of International Preliminary Report on Patentability dated Mar. 30, 2006 for International Application No. PCT/JP2004/013741.

* cited by examiner

Fig. 7

| ENABLE CONTROL SIGNAL | WHEN CA MODULE 14 IS NOT INSERTED | WHEN CA MODULE 14 IS INSERTED | | |
|---|---|---|---|---|
| | | CI | CABLE CARD | |
| | | | INITIAL STATE | OPERATING STATE |
| D | OFF | ON | OFF | OFF |
| E | OFF | OFF | OFF | ON |
| F | OFF | ON | ON | OFF |
| H | OFF | OFF | OFF | ON |
| J | OFF | ON | ON | ON |
| K | ON | ON | ON | ON |

*Fig. 8*

| BUFFER POWER SUPPLY AND PC CARD POWER SUPPLY Vcc | WHEN CA MODULE 14 IS NOT INSERTED | WHEN CA MODULE 14 IS INSERTED | | |
|---|---|---|---|---|
| | | CI | CABLE CARD | |
| | | | INITIAL STATE | OPERATING STATE |
| | 3.3V | 5V | 3.3V | 3.3V |

Fig. 13

| Enable Control Signal | ISDB-T IN JAPAN | DVB-T IN EUROPE | OPEN CABLE IN NORTH AMERICA | |
|---|---|---|---|---|
| | | | CABLE CARD | |
| | | | INITIAL STATE | OPERATING STATE |
| D | OFF | ON | OFF | OFF |
| E | OFF | OFF | OFF | ON |
| F | OFF | ON | ON | OFF |
| H | OFF | OFF | OFF | ON |
| J | OFF | ON | ON | ON |
| K | ON | ON | ON | ON |

Fig. 14

| BUFFER POWER SUPPLY AND PC CARD POWER SUPPLY Vcc | ISDB-T IN JAPAN | DVB-T IN EUROPE | OPEN CABLE IN NORTH AMERICA | |
|---|---|---|---|---|
| | | | CABLE CARD | |
| | | | INITIAL STATE | OPERATING STATE |
| | 3.3V | 5V | 3.3V | 3.3V |

Fig. 16

| ISDB-T IN JAPAN | DVB-T IN EUROPE | OPEN CABLE IN NORTH AMERICA | |
|---|---|---|---|
| | | INITIAL STATE OF CABLE CARD | OPERATING STATE OF CABLE CARD |
| NOT IN USE | CPU DATA[3] | CPU DATA[3] | CPU DATA[3] |
| NOT IN USE | CPU DATA[4] | CPU DATA[4] | CPU DATA[4] |
| NOT IN USE | CPU DATA[5] | CPU DATA[5] | CPU DATA[5] |
| NOT IN USE | CPU DATA[6] | CPU DATA[6] | CPU DATA[6] |
| NOT IN USE | CPU DATA[7] | CPU DATA[7] | CPU DATA[7] |
| NOT IN USE | CE1# | CE1# | CE1# |
| NOT IN USE | CPU ADDRESS[10] | CPU ADDRESS[10] | NOT IN USE |
| NOT IN USE | OE# | OE# | OE# |
| NOT IN USE | CPU ADDRESS[11] | CPU ADDRESS[11] | NOT IN USE |
| NOT IN USE | CPU ADDRESS[9] | CPU ADDRESS[9] | DRX |
| NOT IN USE | CPU ADDRESS[8] | CPU ADDRESS[8] | CRX |
| NOT IN USE | CPU ADDRESS[13] | CPU ADDRESS[13] | NOT IN USE |
| NOT IN USE | CPU ADDRESS[14] | CPU ADDRESS[14] | TS OUT CLOCK |
| NOT IN USE | WE# | WE# | WE# |
| NOT IN USE | IREQ# | READY | IREQ# |
| NOT IN USE | TS IN VALID | CPU ADDRESS[16] | TS IN VALID |
| NOT IN USE | TS IN CLOCK | CPU ADDRESS[15] | TS IN CLOCK |
| NOT IN USE | CPU ADDRESS[12] | CPU ADDRESS[12] | NOT IN USE |
| NOT IN USE | CPU ADDRESS[7] | CPU ADDRESS[7] | QTX |
| NOT IN USE | CPU ADDRESS[6] | CPU ADDRESS[6] | ETX |
| NOT IN USE | CPU ADDRESS[5] | CPU ADDRESS[5] | ITX |
| NOT IN USE | CPU ADDRESS[4] | CPU ADDRESS[4] | CTX |
| NOT IN USE | CPU ADDRESS[3] | CPU ADDRESS[3] | NOT IN USE |
| NOT IN USE | CPU ADDRESS[2] | CPU ADDRESS[2] | NOT IN USE |

Fig. 17

| ISDB-T IN JAPAN | DVB-T IN EUROPE | OPEN CABLE IN NORTH AMERICA | |
|---|---|---|---|
| | | INITIAL STATE OF CABLE CARD | OPERATING STATE OF CABLE CARD |
| NOT IN USE | CPU ADDRESS[1] | CPU ADDRESS[1] | CPU ADDRESS[1] |
| NOT IN USE | CPU ADDRESS[0] | CPU ADDRESS[0] | CPU ADDRESS[0] |
| NOT IN USE | CPU DATA[0] | CPU DATA[0] | CPU DATA[0] |
| NOT IN USE | CPU DATA[1] | CPU DATA[1] | CPU DATA[1] |
| NOT IN USE | CPU DATA[2] | CPU DATA[2] | CPU DATA[2] |
| NOT IN USE | IOIS16# | WP | IOIS16# |
| NOT IN USE | CD1# | CD1# | CD1# |
| NOT IN USE | TS OUT DATA[3] | CPU DATA[11] | TS OUT DATA[3] |
| NOT IN USE | TS OUT DATA[4] | CPU DATA[12] | TS OUT DATA[4] |
| NOT IN USE | TS OUT DATA[5] | CPU DATA[13] | TS OUT DATA[5] |
| NOT IN USE | TS OUT DATA[6] | CPU DATA[14] | TS OUT DATA[6] |
| NOT IN USE | TS OUT DATA[7] | CPU DATA[15] | TS OUT DATA[7] |
| NOT IN USE | CE2# | CE2# | CE2# |
| NOT IN USE | VS1# | VS1# | VS1# |
| NOT IN USE | IORD# | RESERVED | IORD# |
| NOT IN USE | IOWR# | RESERVED | IOWR# |
| NOT IN USE | TS IN SYNC | CPU ADDRESS[17] | TS IN SYNC |
| NOT IN USE | TS IN DATA[0] | CPU ADDRESS[18] | TS IN DATA[0] |
| NOT IN USE | TS IN DATA[1] | CPU ADDRESS[19] | TS IN DATA[1] |
| RESET2 (OPTION) | TS IN DATA[2] | CPU ADDRESS[20] | TS IN DATA[2] |
| CLOCK2 (OPTION) | TS IN DATA[3] | CPU ADDRESS[21] | TS IN DATA[3] |
| I/O2 (OPTION) | TS IN DATA[4] | CPU ADDRESS[22] | TS IN DATA[4] |
| RESET1 | TS IN DATA[5] | CPU ADDRESS[23] | TS IN DATA[5] |
| CLOCK1 | TS IN DATA[6] | CPU ADDRESS[24] | TS IN DATA[6] |

Fig. 18

| ISDB-T IN JAPAN | DVB-T IN EUROPE | OPEN CABLE IN NORTH AMERICA ||
| --- | --- | --- | --- |
| | | INITIAL STATE OF CABLE CARD | OPERATING STATE OF CABLE CARD |
| 1/01 | TS IN DATA[7] | CPU ADDRESS[25] | TS IN DATA[7] |
| NOT IN USE | TS OUT CLOCK | VS2# | VS2# |
| NOT IN USE | RESET | RESET | RESET |
| NOT IN USE | WAIT# | WAIT# | WAIT# |
| NOT IN USE | INPACK# | RESERVED | INPACK# |
| NOT IN USE | REG# | REG# | REG# |
| NOT IN USE | TS OUT VALID | BVD2 | TS OUT VALID |
| NOT IN USE | TS OUT SYNC | BVD1 | TS OUT SYNC |
| NOT IN USE | TS OUT DATA[0] | TS OUT DATA[8] | TS OUT DATA[0] |
| NOT IN USE | TS OUT DATA[1] | TS OUT DATA[9] | TS OUT DATA[1] |
| NOT IN USE | TS OUT DATA[2] | TS OUT DATA[10] | TS OUT DATA[2] |
| NOT IN USE | CD2# | CD2# | CD2# |

Fig. 19

| ISDB-T IN JAPAN | DVB-T IN EUROPE | OPEN CABLE IN NORTH AMERICA |
| --- | --- | --- |
| Y[7] | Y[7] | Y[7] |
| Y[6] | Y[6] | Y[6] |
| Y[5] | Y[5] | Y[5] |
| Y[4] | Y[4] | Y[4] |
| Y[3] | Y[3] | Y[3] |
| Y[2] | Y[2] | Y[2] |
| Y[1] | Y[1] | Y[1] |
| Y[0] | Y[0] | Y[0] |
| UV[7] | UV[7] | UV[7] |
| UV[6] | UV[6] | UV[6] |
| UV[5] | UV[5] | UV[5] |
| UV[4] | UV[4] | UV[4] |
| UV[3] | UV[3] | UV[3] |
| UV[2] | UV[2] | UV[2] |
| UV[1] | UV[1] | UV[1] |
| UV[0] | UV[0] | UV[0] |
| H SYNC | H SYNC | H SYNC |
| V SYNC | V SYNC | V SYNC |
| CLOCK | CLOCK | CLOCK |

Fig. 20

| ISDB-T IN JAPAN | DVB-T IN EUROPE | OPEN CABLE IN NORTH AMERICA |
|---|---|---|
| TS1 DATA[7] | TS1 DATA[7] | TS1 DATA[7] |
| TS1 DATA[6] | TS1 DATA[6] | TS1 DATA[6] |
| TS1 DATA[5] | TS1 DATA[5] | TS1 DATA[5] |
| TS1 DATA[4] | TS1 DATA[4] | TS1 DATA[4] |
| TS1 DATA[3] | TS1 DATA[3] | TS1 DATA[3] |
| TS1 DATA[2] | TS1 DATA[2] | TS1 DATA[2] |
| TS1 DATA[1] | TS1 DATA[1] | TS1 DATA[1] |
| TS1 DATA[0] | TS1 DATA[0] | TS1 DATA[0] |
| TS1 VALID | TS1 VALID | TS1 VALID |
| TS1 SYNC | TS1 SYNC | TS1 SYNC |
| TS1 CLK | TS1 CLK | TS1 CLK |
| TS2 DATA[7] (OPTION) | TS2 DATA[7] (OPTION) | TS2 DATA[7] (OPTION) |
| TS2 DATA[6] (OPTION) | TS2 DATA[6] (OPTION) | TS2 DATA[6] (OPTION) |
| TS2 DATA[5] (OPTION) | TS2 DATA[5] (OPTION) | TS2 DATA[5] (OPTION) |
| TS2 DATA[4] (OPTION) | TS2 DATA[4] (OPTION) | TS2 DATA[4] (OPTION) |
| TS2 DATA[3] (OPTION) | TS2 DATA[3] (OPTION) | TS2 DATA[3] (OPTION) |
| TS2 DATA[2] (OPTION) | TS2 DATA[2] (OPTION) | TS2 DATA[2] (OPTION) |
| TS2 DATA[1] (OPTION) | TS2 DATA[1] (OPTION) | TS2 DATA[1] (OPTION) |
| TS2 DATA[0] (OPTION) | TS2 DATA[0] (OPTION) | TS2 DATA[0] (OPTION) |
| TS2 VALID (OPTION) | TS2 VALID (OPTION) | TS2 VALID (OPTION) |
| TS2 SYNC (OPTION) | TS2 SYNC (OPTION) | TS2 SYNC (OPTION) |
| TS2 CLK (OPTION) | TS2 CLK (OPTION) | TS2 CLK (OPTION) |

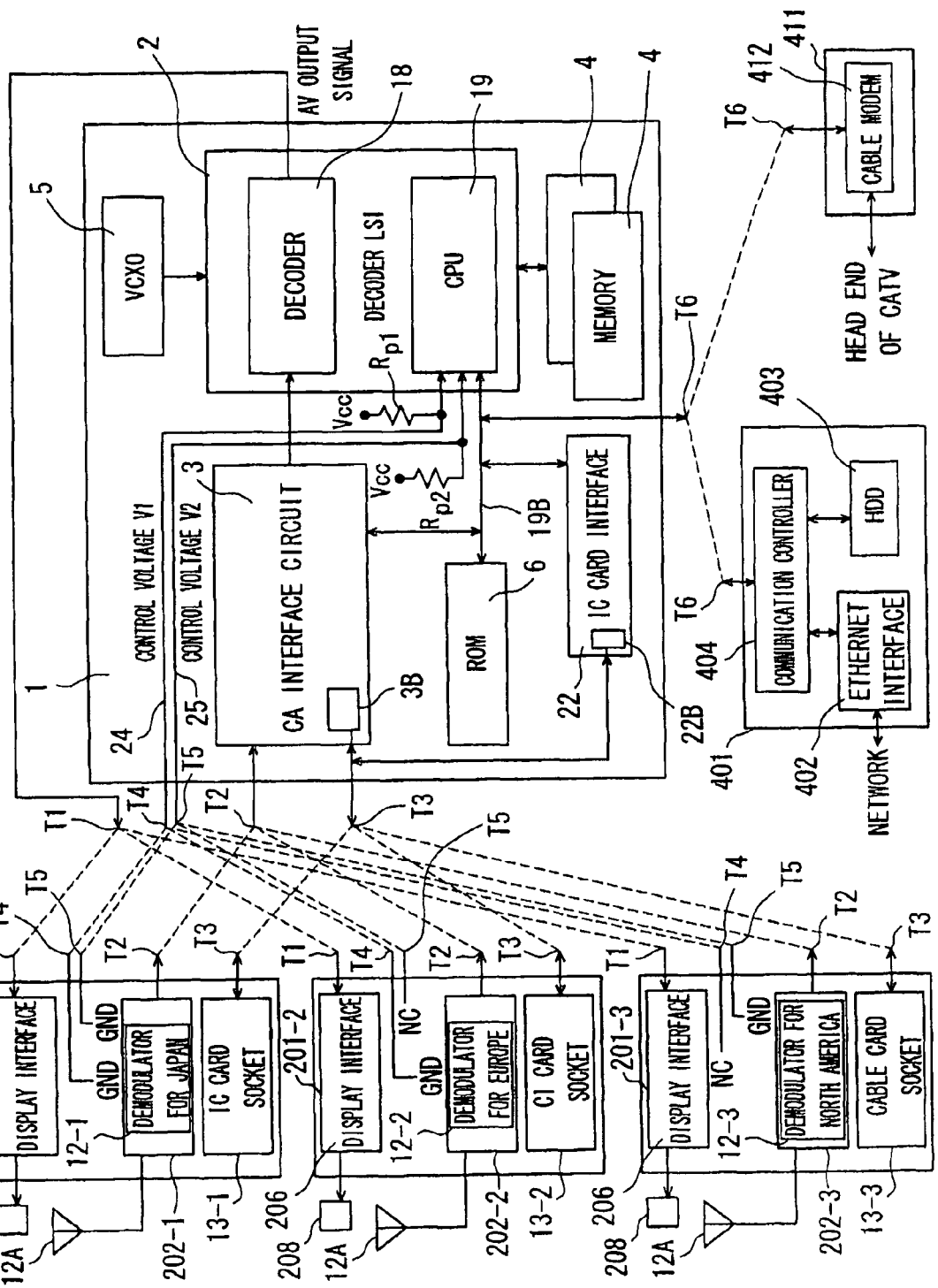

DIGITAL TELEVISION RECEIVER MODULE AND DIGITAL TELEVISION RECEIVER USING THE SAME

TECHNICAL FIELD

The present invention relates to a digital television receiver module for use in a digital television receiver (referred to as a DTV hereinafter) for receiving digital television broadcasting such as a television receiver, a personal computer, a mobile terminal apparatus and a recorder apparatus for recording a video signal and an audio signal on a recording medium such as an optical disk, and relates to a digital television receiver including the digital television receiver module.

BACKGROUND ART

In recent years, upgrade of the television broadcasting to the digital technology started in respective countries and areas including Japan, North America and Europe, and digital television broadcasting receivers that meet to broadcasting standards of the respective countries and areas are on sale. For example, in the case of the digital terrestrial television broadcasting, the following three standards are recommended, since contents of services and technological level at the time of introduction differ according to the countries and areas. A DVB-T (Digital Video Broadcasting-Terrestrial) system is adopted in Europe, an ATSC (Advanced Television systems Committee) system is adopted in U.S.A., and an ISDB-T (Integrated Services Digital Broadcasting-Terrestrial) system is adopted in Japan. In China, such a standardization process based on the DVB-T system adopted in Europe is advanced.

All of video and audio compression systems adopted in the above-mentioned standards conform to an MPEG-2 standard. Transmission systems also conform to an MPEG-2_TS signal (Transport Stream) standards. Accordingly, interfaces and circuits provided to a video and an audio decoder in the DTV can be commonly used in all of the countries and areas. If described in detail, compression systems such as the MPEG-2 currently adopted in the digital television broadcasting and an H.264 of ITU expected to be adopted in the future basically use an algorithm in which a motion vector is detected and a motion is predicted for coding. A decoder for decoding a video signal and an audio signal compressed according to these systems can be realized using a single hardware, a CPU and software operated on the CPU. Any differences among detailed specifications in the respective systems can be dealt with by changing the software. Accordingly, in the case of a subsequent circuit, that is a hardware circuit of the decoder, provided at the subsequent stage of a demodulator for demodulating a received signal into the MPEG-2_TS signal, manufacturers of the relevant module can commercialize a decoder commonly usable in the world to increase an effect of mass production.

On the other hand, a circuit relevant to such processings that are executed by the time when a television broadcast wave signal received via an antenna or the like is demodulated into the MPEG-2_TS signal, is called a front-end circuit. A tuner and a demodulator in the front-end circuit often largely depend on radio-wave policies peculiar to the respective countries and areas, and the respective countries and areas adopt different systems. With regard to a demodulation system used in the demodulator, a QAM system (Quadrature Amplitude Modulation) system is adopted in the DVB-T system and ISDB-T system, and a VSB (Vestigial Side Band) system is adopted in the ATSC system.

A CA (Conditional Access) part provided between the front-end circuit and the decoder operates integrally with an external conditional access module (referred to as a CA module hereinafter). In the CA part, since the CA part relates to businesses, different encryption systems and interface specifications with respect to the CA module are often employed in respective business areas and markets. A CI (Common Interface) system is adopted in the DVB-T system, a CableCARD interface is adopted in cable television broadcasting conforming to an Open Cable Standards in U.S.A., and an IC card interface is adopted in the ISDB-T system. These interfaces connect thereto such CA modules having different physical and electrical specifications in terms of terminal specifications. Accordingly, manufacturers of the digital television receiver have conventionally combined the decoder commonly usable in the world, front-end circuit modules for the respective countries and areas, and the CA parts for the respective markets, so as to commercialize digital television receivers having different configurations for the respective markets, and ensured operations thereof.

The CI is described in the Non-Patent Document 1, the CableCARD (formerly called POD) is described in the Non-Patent Document 2, and the IC card interface is described in the Non-Patent Document 3.

On the other hand, an attempt for complying with a plurality of markets by combining the CA parts is examined (for example, see the Patent Document 1). In the Patent Document 1, there is provided a plurality of CA module interfaces capable of connecting to respective CA modules. In addition, the plurality of CA modules are connected in series to each other.

Patent Document 1: Japanese patent laid-open publication No. P2000-36820A;

Patent Document 2: International application publication No. WO01/047267;

Non-Patent Document 1: EUROPEAN STANDARD EN50221, Common Interface Specification for Conditional Access and other Digital Video Broadcasting Decoder Applications, English Version, Ref. No. EN50221:1996E, February, 1997;

Non-Patent Document 2: AMERICAN NATIONAL STANDARD ANSI/SCTE28 2001 (Formerly DVS 295), HOST-POD Interface Standard, Engineering Committee Digital Video Subcommitte, Society of Cable Telecommunications Engineers, 2001;

Non-Patent Document 3: ISO7816-1 Standard, asynchronous smartcard information, Version 1.00, last revised on Jun. 12, 1995;

Non-Patent Document 4: PC Card Standard, Volume 2, Electrical Specification, PCMCIA/JEITA, 2001; and Non-Patent Document 5: SCTE40 2001 (Formerly DVS 313), Digital Cable Network Interface Standard, Engineering Committee Digital Video Subcomittee, Society of Cable Telecommunications Engineers 2001.

DISCLOSURE OF INVENTION

Problems to be Solved by the Invention

However, under the above-mentioned situation, a front-end circuit module varies depending on the countries and areas, and the physical and electrical specifications of the CA module varies depending on the markets. Accordingly, the manufacturers of the digital television receiver have combined the decoder commonly usable in the world, front-end circuit modules for the respective countries and areas, and the CA parts for the respective markets, so as to commercialize the digital television receivers having different configurations for the respective countries, areas and markets. Accordingly, for each commercialization, it took labors and costs to design a substrate on which the decoder, front-end circuit module and CA module interface are mounted, and to ensure the operation thereof. This led to such a problem that a price of a product could not be lowered. In particular, an operation of the product including the CA module often needs to be certified by a certification authority in each of the markets. Accordingly, it took labors to certificate the product for each commercialization, and this led to an increased manufacturing cost. Further, the manufacturers of the digital television receiver have combined not only the decoder commonly usable in the world, the front-end circuit modules for the respective countries and areas, and the CA parts for the respective markets, but also an LSI for function expansion such as network connection, so as to commercialize digital television receivers including high-end and low-end digital television receivers in the respective countries and areas. Accordingly, for each commercialization, it took labors and costs to design a substrate on which the decoder, front-end circuit module, CA module interface and the LSI for function expansion are mounted, and to ensure the operation thereof. This led to such a problem that the price of the product could not be lowered.

In addition, in the configuration described in the Patent Document 1, it is necessary to provide the CA module interfaces, respectively. Accordingly, the costs of interface circuits and sockets increase, and this leads to a disadvantage in the costs, in realizing a DTV module commonly usable in the respective markets and including the CA module. Accordingly, such a problem arose that an effect of a cost reduction by an effect of mass production to be given by the standardization became smaller.

In addition, as a number of provided interfaces increases, number of connection terminals thereof that are connected to the CA modules increases. For example, numbers of terminals of the CI card and the CableCARD are 68, respectively, and at least 136 terminals are necessary in CA module interfaces for these two CA modules alone. Accordingly, the number of connection terminals that are connected to the CA modules increase, and this leads to a disadvantage in downsizing, in realizing the DTV module commonly usable in the respective markets and including the CA module. Accordingly, such a problem arose that the number of connection terminals became a bottleneck in downsizing by modularization. In particular, when a module is realized by formation into a semiconductor chip or a print wiring substrate having a multi-layer structure, so as to microminiaturize the module, an area occupied by the connection terminals remarkably increases relative to an area of the semiconductor chip or an area of a print substrate. This is because the downsizing of the connection terminals, which is affected by a pitch of a wiring connected to the terminals and a connection method, is limited. Accordingly, when the number of the connection terminals is increased, the area of the increased connection terminals determines the areas of the chip and print substrate in some cases, and such a problem arose that the downsizing was impossible.

A first object of the present invention is to provide a DTV module capable of solving the above-mentioned problems, directly connecting the front-end circuits for the respective countries and areas and the CA modules for the respective markets thereto, and being manufactured easily and inexpensively as compared with the prior art, and to provide a digital television receiver including the DTV module.

In addition, a second object of the present invention is to provide a DTV module capable of solving the above-mentioned problems, directly connecting the front-end circuits for the respective countries and areas, the CA modules, and function expansion boards for the respective markets thereto, and being manufactured easily and inexpensively as compared with the prior art, and to provide a digital television receiver including the DTV module.

Means for Solving the Problems

A digital television receiver module according to the present invention is a digital television receiver module for use in a digital television receiver for receiving a digital television signal having a first connecting device, a decoding device, a control device, and an interface device. The first connecting device has a plurality of terminals for electrically connecting to one external substrate among external substrates which can receive digital television signals of broadcasting systems different from each other. In addition, the decoding device executes a decoding processing on a digital television signal inputted from a demodulator provided on the external substrate via the first connecting device, so as to convert the digital television signal into a video signal and an audio signal, and outputs the video signal and audio signal via the first connecting device. Further, the control device controls an operation of the digital television receiver module. The interface device is connected to one conditional access module among a plurality of types of conditional access modules having electrical specifications different from each other via the first connecting device, and is connected to the demodulator, the decoding device, and the control device. The interface device executes input and output processings on a plurality of signals communicated among the demodulator, the conditional access module, the decoding device, and the control device. The control device controls the interface device by switching over among types of signals communicated via the first connecting device, so as to conform to electrical specifications of a connected conditional access module, in response to at least one of a broadcasting system of an inputted digital television signal and a type of the connected conditional access module.

In the above-mentioned digital television receiver module, the interface device outputs a digital television signal inputted from the demodulator to the decoding device and the conditional access module via said first connecting device.

In addition, in the above-mentioned digital television receiver module, the interface device preferably includes a plurality of buffers, and the control device controls on-off states of respective buffers so as to control the input and output processings.

Further, in the above-mentioned digital television receiver module, when the conditional access module is not connected to the control device via the first connecting device, the control device preferably controls the interface means so that a detection signal from the conditional access module is outputted to the control device.

In the above-mentioned digital television receiver module, when a first type conditional access module among the plurality of types of conditional access modules is connected to the control device via the first connecting device, the control device preferably controls the interface device so that a digital television signal inputted from the connected conditional access module via the first connecting device is outputted to the decoding device.

In addition, in the above-mentioned digital television receiver module, the control device preferably outputs a first power-supply voltage to the connected conditional access module via the first connecting device, and controls the interface device so that an address signal and a data signal from the control device are outputted to the connected conditional access module via the first connecting device on the first power-supply voltage.

Further, in the above-mentioned digital television receiver module, the first type conditional access module is preferably a conditional access module of a Common Interface.

In the above-mentioned digital television receiver module, in such an initial state that a second type conditional access module among the plurality of types of conditional access modules is connected to the control device via the first connecting device, the control device preferably controls the interface device, so that a second power-supply voltage is outputted to the connected conditional access module via the first connecting device, a digital television signal inputted from the connected conditional access module via the first connecting device is outputted to the decoding device, and an address signal and a data signal from the control device are outputted to the connected conditional access module via the first connecting device on the second power-supply voltage.

In addition, in the above-mentioned digital television receiver module, in such an operating state that is after the initial state that the second type conditional access module among the plurality of types of conditional access modules is connected to the control device via the first connecting device, the control device preferably controls the interface device, so that a clock signal inputted from the connected conditional access module via the first connecting device is outputted to the decoding device, a control signal inputted from the demodulator via the first connecting device is outputted to the connected conditional access module via the first connecting device, and a control signal inputted from the connected conditional access module via the first connecting device is outputted to the demodulator via the first connecting device.

Further, in the above-mentioned digital television receiver module, the second type conditional access module is preferably a conditional access module of a CableCARD.

In addition, the above-mentioned digital television receiver module, preferably further includes a further interface device for connecting a third type conditional access module to the interface device and the control device.

In addition, in the above-mentioned digital television receiver module, the third type conditional access module is preferably a conditional access module of an IC card.

The above-mentioned digital television receiver module preferably further includes a device for selectively switching over between:

(a) a first state that the first connecting device is connected to the interface device; and (b) a second state that the first connecting device is connected to the further interface device.

In addition, in the above-mentioned digital television receiver module, the digital television receiver module preferably includes a substrate having a plurality of layers, and a capacitor layer substrate on which a plurality of thin-film capacitors are mounted and a resistance layer substrate on which a plurality of thin-film resistances are mounted, are sandwiched between a first signal wiring layer substrate and a second signal wiring layer substrate.

Further, in the above-mentioned digital television receiver module, the first connecting device, the digital television receiver module can connect to one of the following:

(a) a first type external substrate conforming to a first broadcasting system, and including a first type demodulator and a second connecting device which can connect the first type conditional access module thereto; and (b) a second type external substrate conforming to a second broadcasting system, and including a second type demodulator and a second connecting device which can connect the second type conditional access module thereto.

In the above-mentioned digital television receiver module, the control device detects a type of the external substrate and a broadcasting system of the inputted digital television signal, based on a type-identifying data signal inputted from the external substrate via the first connecting device. In addition, based on a detected broadcasting system, the control device controls an operation of the decoding device and switches over among the types of the signals communicated via the first connecting device so as to control the interface device.

In addition, the digital television receiver module the type-identifying data signal is preferably generated so as to differ depending on the type of the external substrate, by connecting or not connecting the external substrate to a ground conductor.

Further, in the above-mentioned digital television receiver module, the type-identifying data signal is preferably a signal of read-out data which is obtained by reading out data stored in a memory mounted on the external substrate so as to differ depending on the type of the external substrate.

Still further, in the above-mentioned digital television receiver module, the broadcasting system preferably includes at least one of DVB-T system, ATSC system and ISDB-T system.

In addition, the above-mentioned digital television receiver module preferably further includes third connecting device for connecting a plurality of types of function expansion substrates, and the plurality of types of function expansion substrates has functions different from each other to expand a function of the digital television receiver module.

Further, in the above-mentioned digital television receiver module, the function expansion boards preferably include at least one of a network function expansion board for connection to a network, and a CATV modem function expansion board for connection to a head end of a CATV.

A digital television receiver according to the present invention is a digital television receiver includes the above-mentioned digital television receiver module and the external substrate. The external substrate includes a first type demodulator and a second connecting device for connecting a first type conditional access module thereto. The external substrate is a first type external substrate conforming to a first broadcasting system.

In addition, a digital television receiver according to the present invention is a digital television receiver includes the above-mentioned digital television receiver module and the external substrate. The external substrate includes a first type demodulator and a second connecting device for connecting a first type conditional access module thereto. The external substrate is a first type external substrate conforming to a first broadcasting system, and the digital television receiver module further includes a first type the function expansion substrate.

In the above-mentioned digital television receiver, the external substrate preferably includes a plurality of circuits corresponding to a plurality of types of display devices different from each other, respectively. The external substrate preferably further includes one of a plurality of types of display interfaces for outputting video signal and audio signal outputted from the digital television receiver module to the display devices.

In addition, in the above-mentioned digital television receiver, each of the displays is preferably one of a liquid crystal display, a plasma display and a CRT display.

A digital television receiver according to the present invention is a digital television receiver includes the above-mentioned digital television receiver module and the external substrate. The external substrate includes a first type demodulator, a second connecting device for connecting a first type conditional access module thereto, and a first type display interface for connecting a first type display thereto. The external substrate conforms to a first broadcasting system and is a first type external substrate connected to the first type display device.

In addition, digital television receiver according to the present invention is a digital television receiver includes the above-mentioned digital television receiver module and the external substrate. The external substrate includes a first type demodulator, a second connecting device for connecting a first type conditional access module thereto, and a first type display interface for connecting a first type display thereto. The external substrate conforms to a first broadcasting system and is a first type external substrate connected to the first type display device. The digital television receiver module further includes a first type the function expansion substrate.

In the above-mentioned digital television receiver, the digital television receiver module is preferably formed by a first dielectric substrate, the external substrate is preferably formed by a second dielectric substrate, and a dielectric constant of the second dielectric substrate is preferably larger than a dielectric constant of the first dielectric substrate.

Effects of the Invention

Therefore, the DTV module according to the present invention includes the decoder commonly usable in the respective countries and areas, and can directly connect thereto the front-end circuits for the respective countries and the areas and the CA modules for the respective markets. Accordingly, the DTV module according to the present invention can ensure that the DTV module connects to the front-end circuits for the respective countries and areas and the CA modules for the respective markets so as to operate with connected front-end circuits.

In addition, it is possible to manufacture receivers for the respective countries, areas, and markets, by preparing motherboards which are adapted to be capable of connect to the DTV modules for the respective countries, areas, and markets, and by connecting the DTV modules to the motherboards. Accordingly, when the manufacturers of the digital television receiver uses the DTV module according to the present invention, they can easily manufacture the digital television receivers for the respective countries, areas, and markets, by designing a motherboard on which the front-end circuit modules for the respective countries and areas and a socket of the CA modules for the respective markets are mounted. Further, when a certification of an operation of the DTV module including the CA is finished by each of the certification authorities in the respective markets, the labors and costs for certifying each product can be saved. As a result, the manufacturing cost borne by of the manufacturers can be reduced, and this leads to a lower price of the digital television receiver.

In addition, according the DTV module of the present invention, the interface circuits and the sockets for connecting to a plurality of types of the CA modules, whose electrical specifications are different in the respective markets, can be standardized. Accordingly, it is possible to realize and manufacture a DTV module including the CA interface and usable in the world, without increasing the manufacturing cost. Accordingly, the effect of the cost reduction by the effect of mass production can be realized, and this leads to the popularization of the digital television receiver.

Further, it is possible to realize the DTV module including the interface without increasing number of the connection terminals connected to the CA module. Accordingly, by modularizing the DTV module, the DTV module can be made small in size and weight, and the DTV module can be applied to a mobile receiver, an in-vehicle receiver, and the like. This leads to the popularization of the digital television receiver. An increase of a number of terminals of a DTV module, which is resulted from connecting the DTV module to the front-end circuits for the respective countries and areas and the CA modules for the respective markets, can be controlled. Accordingly, the present invention can solve the problem that the downsizing is impossible because the area of the connection terminals determines the areas of the chip and print substrate, particularly when the module is microminiaturized as in the case of the semiconductor chip and print wiring substrate having the multi-layer structure.

Still further, according to the DTV module of the present invention, the network function expansion board is connected to the DTV module so that the network-related function can be provided thereto, and the CATV modem function expansion board is connected to the DTV module so that the CATV modem function can be provided thereto. Accordingly, when the manufacturers of the digital television receiver used the DTV module according to the present invention, they can easily manufacture the digital television receivers including the low-end and high-end digital television receivers for the respective areas and markets at a lower cost and in a smaller size and weight, as compared with the prior art, by designing the motherboard on which the front-end circuit modules for the respective countries and areas and sockets of the CA modules for the respective markets are mounted and the function expansion board, and by combining the motherboard and the function expansion board.

BRIEF DESCRIPTION OF DRAWINGS

FIG. 7 is a diagram showing a table of on-off states of enable control signals D, E, F, H, J and K supplied from a CPU 19 to buffers 33 to 43 shown in FIG. 6.

FIG. 8 is a diagram showing a table of power-supply voltages supplied to the buffers 33 to 43 shown in FIG. 6 and a PC card.

FIG. 13 is a diagram showing a table of on-off states of the enable control signals D, E, F, H, J and K supplied from the CPU 19 to the buffers 33 to 43 in the system shown in FIG. 11 when the CA interface circuit 3 shown in FIG. 6 is used.

FIG. 14 is a diagram showing a table of power-supply voltages supplied to the buffers 33 to 43 and the PC card shown in FIG. 6 in the system shown in FIG. 11 when the CA interface circuit 3 of FIG. 6 is used.

FIG. 16 is a diagram showing a first part of a table of input and output signals and terminals of a CA module 14 including an IC card using the ISDB-T system in Japan, an CI card using the DVB-T system in Europe and a CableCARD using the Open Cable system in North America in the system according to the third preferred embodiment.

FIG. 17 is a diagram showing a second part of the table shown in FIG. 16.

FIG. 18 is a diagram showing a third part of the table shown in FIG. 16.

FIG. 19 is a diagram showing a table of video signal and audio signal outputted to a display drive circuit 208 via a display interface 206 shown in FIG. 15 and terminals.

FIG. 20 is a diagram showing a table of respective detailed signals of MPEG-2TS signals from demodulators 12-1, 12-2 and 12-3 shown in FIG. 15 and terminals.

FIG. 21 is a block diagram showing a configuration of a system according to a fourth preferred embodiment of the present invention including the DTV module 1, motherboards 201-1, 201-2 and 201-3 for use in the respective countries connected to the DTV module 1, a network function expansion board 401 and a CATV modem function expansion board 411.

DESCRIPTION OF NUMERICAL REFERENCES

1 . . . DTV module,
2 . . . decoder LSI,
3 . . . CA interface circuit,
3B . . . buffer,
4 . . . memory,
5 . . . VCXO,
6 . . . ROM,
7 . . . capacitor,
9 . . . solder ball,
10 . . . memory,
12, 12-1, 12-2, and 12-3 . . . demodulators,
12A . . . antenna,
13 . . . PC card socket,
13-1 . . . IC card socket,
13-2 . . . CI card socket,
13-3 . . . CableCARD socket,
14 . . . CA module,
18 . . . decoder,
19 . . . CPU,
19B . . . bus,
22 . . . IC card interface,
22B . . . buffer,
23 . . . IC card connector,
24 and 25 . . . signal lines,
31 . . . power-supply voltage switch,
31A, 31B, and 32 . . . power-supply terminals,
33, 34, 35, 36, 37, 38, 39, 40, 40A, 40B, 41, 42, and 43 . . . buffers,
51 and 52 . . . signal wiring layer substrates,
53 . . . capacitor layer substrate,
54 . . . ground conductor layer substrate,
55 . . . resistance layer substrate,
56 . . . power-supply layer substrate,
57 and 58 . . . signal wiring layer substrates,
61 . . . thin-film capacitor,
62 . . . thin-film resistance,
101 . . . motherboard,
102, 102-1, 102-2, and 102-3 . . . front-end circuits,
103 . . . power-supply unit,
104 . . . receiver housing,
104a . . . display unit,
105 . . . socket,
106 . . . AV output circuit,
201, 201-1, 201-2, and 201-3 . . . motherboards,
202 . . . front-end circuit,
203 . . . power-supply unit,
204 . . . television receiver,
204D . . . display,
205 . . . socket,
206 . . . display interface,
207 . . . unipod,
208 . . . display drive circuit,
209-1, 209-2, and 209-3 . . . EEPROMs,
401 . . . network function expansion board,
402 . . . Ethernet interface,
403 . . . hard disk drive,
404 . . . communication controller,
411 . . . CATV modem function expansion board,
412 . . . cable modem,
Rp1 and Rp2 . . . pull-up resistances, and
T1, T2, T3, T4, T5, and T6 . . . connection terminals

BEST MODE FOR CARRYING OUT THE INVENTION

Preferred embodiments according the present invention will be described below with reference to the drawings. In the attached drawings, components similar to each other are denoted by the same numerical references, respectively.

First Preferred Embodiment

Figure 1:
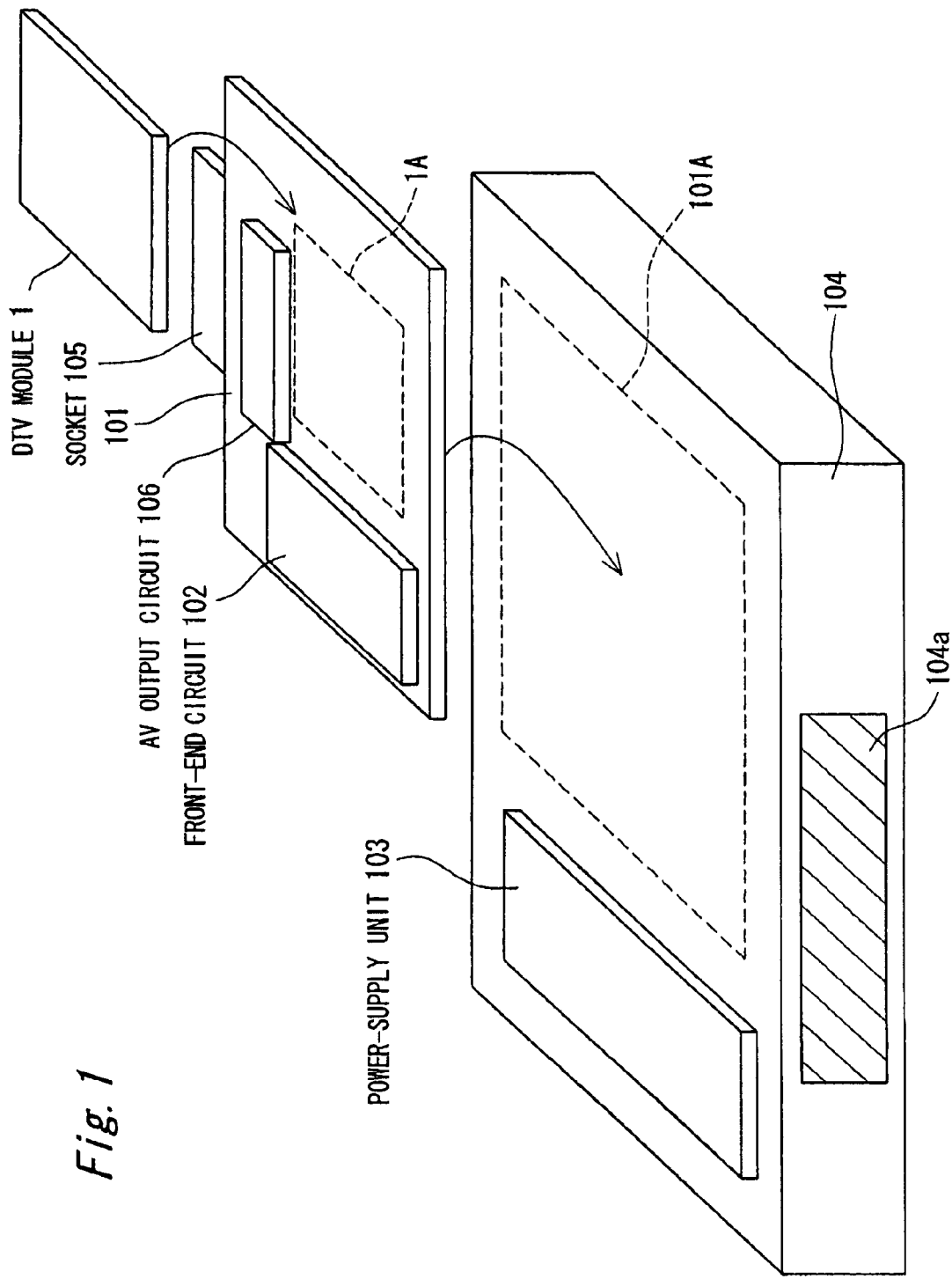
FIG. 1 is a partially exploded mounting view showing a television receiver according to a first preferred embodiment of the present invention when a DTV module 1 is mounted on a motherboard 101 and the motherboard 101 is mounted in a receiver housing 104.
Figure 2:
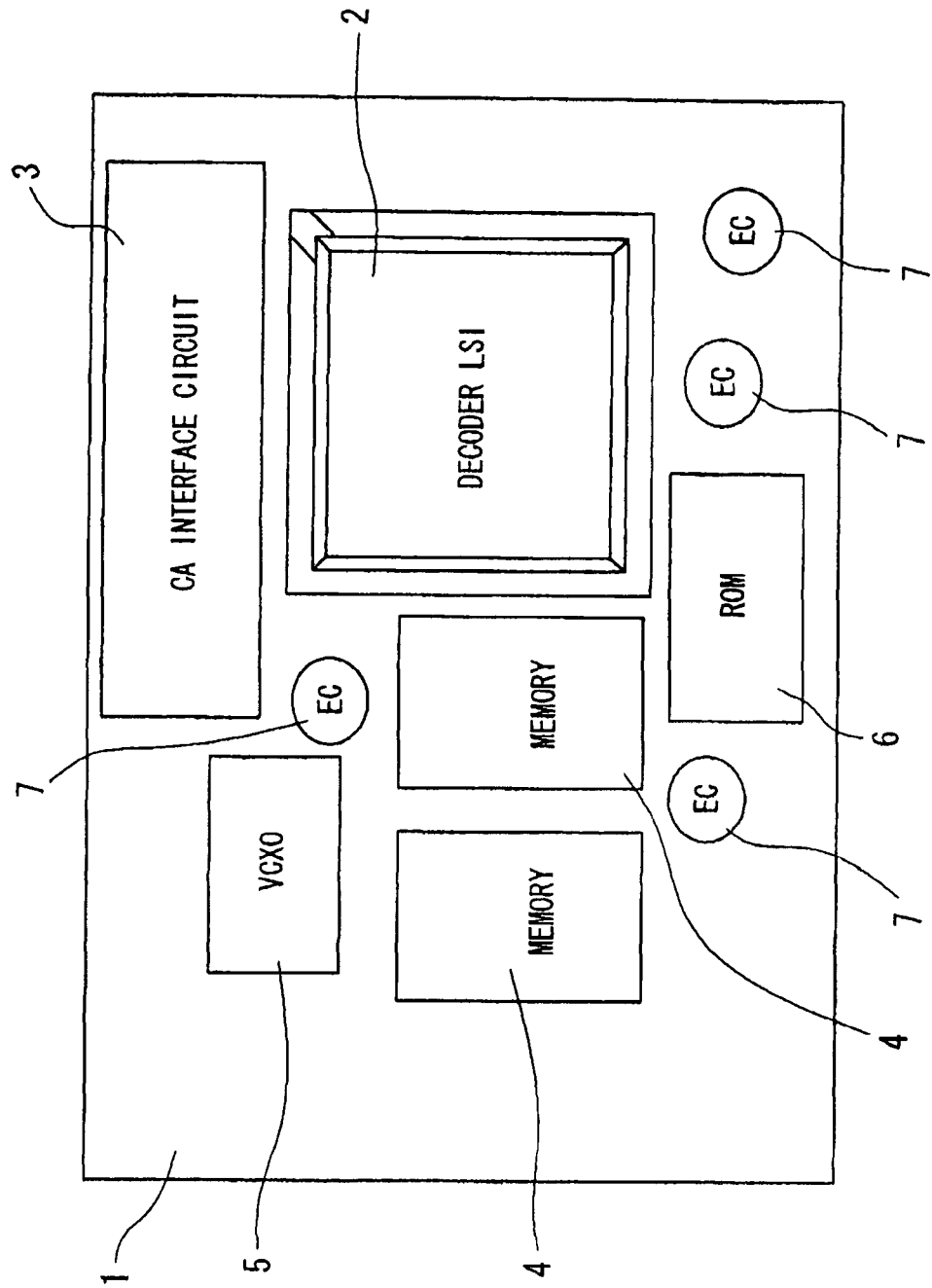
FIG. 2 is a top view of the DTV module 1 shown in FIG. 1.
Figure 3:
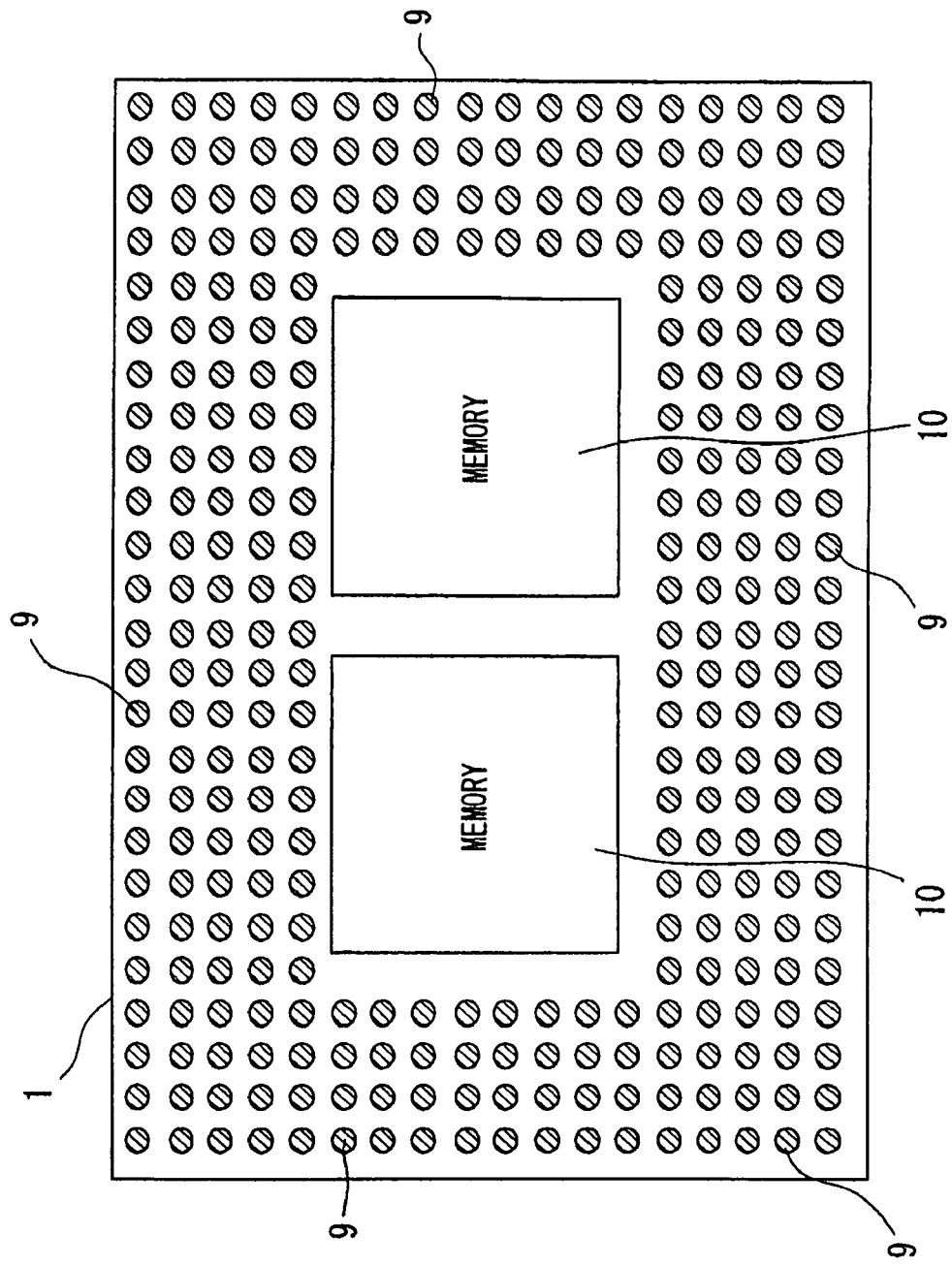
FIG. 3 is a bottom view of the DTV module 1 shown in FIG. 1.
Figure 4:
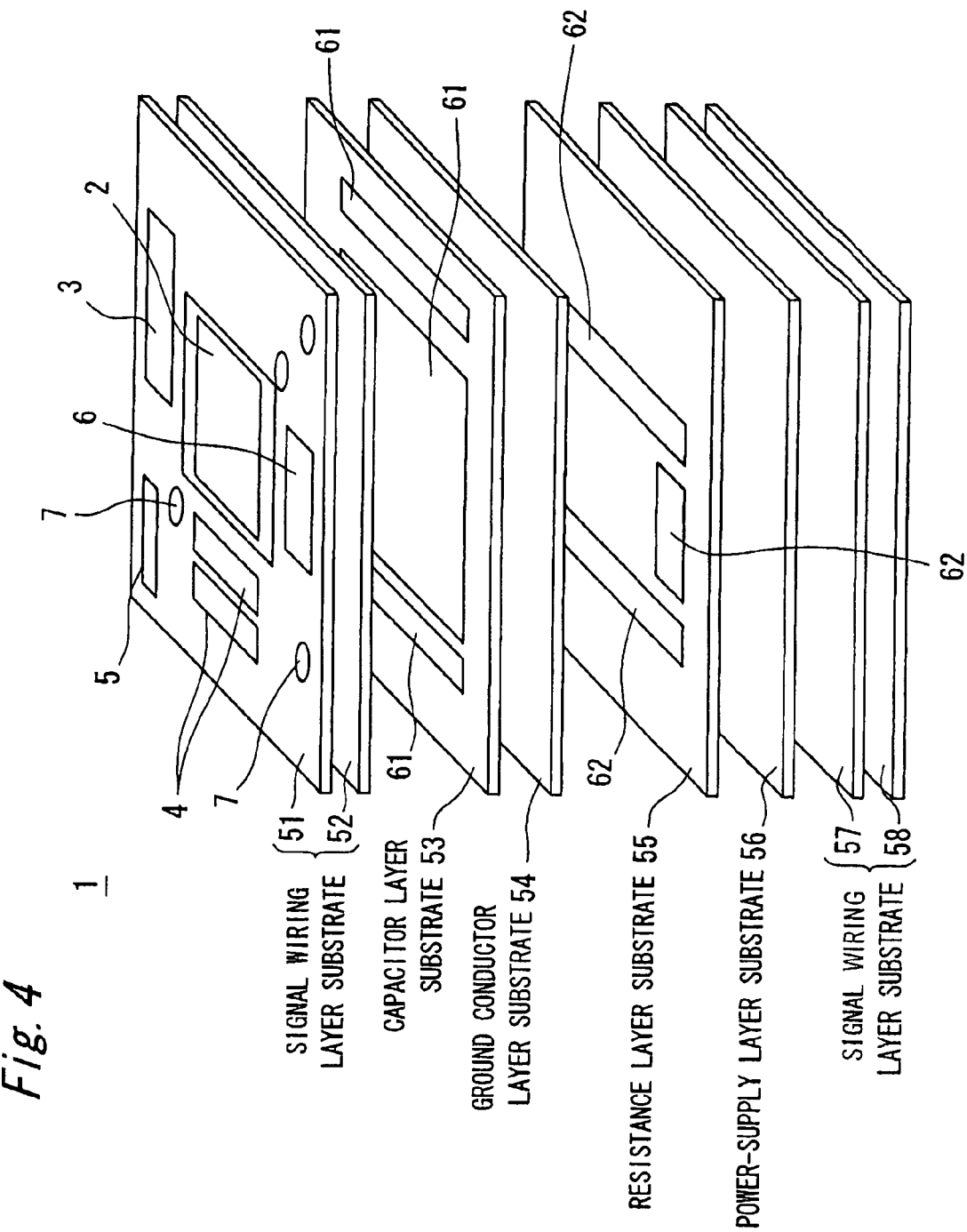
FIG. 4 is an exploded oblique view of a multi-layer structure of the DTV module 1 shown in FIG. 1.

FIG. 1 is a partially exploded mounting view showing a television receiver according to a first preferred embodiment of the present invention when a DTV module 1 is mounted on a motherboard 101 and the motherboard 101 is mounted in a receiver housing 104. In addition, FIG. 2 is a top view of the DTV module 1 shown in FIG. 1, and FIG. 3 is a bottom view of the DTV module 1 shown in FIG. 1. Further, FIG. 4 is an exploded oblique view of a multi-layer structure of the DTV module 1 shown in FIG. 1. In the first preferred embodiment, a digital broadcasting receiver is described below, and in particular, one example of case in which the DTV module 1 in a set-top box is mounted in the television receiver is described.

Referring to FIG. 1, the DTV module 1 for use in the television receiver is mounted at a position 1A on the motherboard 101 formed by a dielectric substrate, and the motherboard 101 is mounted in a position 101A in the receiver housing 104. On the motherboard 101, other than the DTV module 1, circuits such as a front-end circuit 102 and an AV output circuit 106 are mounted. In addition, a socket 105 for connection to an external device is provided to the motherboard 101. A display unit 104a for displaying an operation state of the television receiver is mounted on a front surface of the receiver housing 104, and a power-supply unit 103 for supplying a power-supply voltage to the motherboard 101, and the like is mounted in the receiver housing 104.

Referring to FIG. 2, the DTV module 1 is constructed by a plurality of print wiring substrates 51 to 58 (See FIG. 4) constituting the multi-layer structure and each capable of mounting components on both surfaces thereof, and the components mounted thereon. As shown in FIG. 4, the DTV module 1 is constructed by laminating signal wiring layer substrates 51 and 52, which are mounted on a front surface side of the DTV module 1 and described later in detail with reference to FIG. 2, a capacitor layer substrate 53 on which a plurality of thin-film capacitors 61 are mounted, a ground conductor layer substrate 54 on which a ground conductor is mounted, a resistance layer substrate 55 on which a plurality of thin-film resistances 62 are mounted, a power-supply layer substrate 56 on which a power-supply circuit and a wiring thereof are mounted, and signal wiring layer substrates 57 and 58 which are mounted on a back surface side of the DTV module 1 and described in detail with reference to FIG. 3. By constructing the DTV module 1 as described above, it is possible to manufacture the DTV module 1 which is extremely small in size and thin, as compared with the prior art. On the capacitor layer substrate 53 and the resistance layer substrate 55, that are inner layers, an LSI and a bare chip of a memory, which are components constituting the DTV module 1 and described later, may be mounted, other than the thin-film capacitor 61 and the thin-film resistance 62. Accordingly, by increasing a mounting ratio of the components mounted on the inner layers, the DTV module 1 can be further downsized.

Referring to FIG. 2, components mounted on a component surface of the DTV module 1, which is a front surface thereof, include a decoder LSI 2 for executing decoding processings corresponding to compression systems in the digital television broadcasting in the respective countries and areas, a CA interface circuit 3 which is a Common Interface capable of being directly connected to the CA modules in the respective markets, working memories 4 of the decoder LSI 2, a voltage controlled crystal oscillator (referred to as a VCXO hereinafter) 5 for generating a clock of the decoder LSI 2, a ROM 6 for memorizing data such as a program code for a CPU in the decoder LSI 2, and a capacitor 7 connected to power supplies, which are not shown, for use in respective components.

Referring to FIG. 3, components mounted on a solder surface of the DTV module 1, which is a back surface thereof, includes other working memories 10 of the decoder LSI, solder balls 9 which are terminals for connecting signal lines and power-supply lines when the DTV module 1 is mounted on the motherboard 101. The DTV module 1 can solely execute the decoding processings corresponding to the compression systems in the digital television broadcasting in the respective countries and areas. The DTV module 1 can be connected to the front-end circuit including demodulators 12 for the respective countries and areas, and can be connected to the CA modules for the respective markets.

As shown in FIG. 2, the decoder LSI 2 is disposed substantially at a center of the component surface of the DTV module 1. As shown in FIG. 3, the other working memories 10 are disposed substantially at a center of the solder surface of the DTV module 1 and among the solder balls 9. Accordingly, wirings between the decoder LSI 2 and the other working memories 10 are shortened. Accordingly, a performance of the DTV module 1 can be improved by shortening a delay time in transmission of an electric signal, and a substrate of the DTV module 1 can be downsized because a mounting ratio of components mounted on the solder surface can be improved. In addition, by downsizing of the substrate of the DTV module 1, cost reduction can be achieved. Further, by disposing the other working memories 10 at the center of the solder surface of the DTV module 1, the solder balls 9 can be arranged uniformly in upper, lower, right and left directions around the other working memories 10. Accordingly, the components can be mounted on the DTV module 1 in a well-balanced manner.

In the present preferred embodiment, the respective components are mounted on the print wiring substrates 51, 52, 53, 55, 57 and 58 of the DTV module 1. However, the present invention is not limited to this, and the respective components may be mounted on a semiconductor chip and packaged so as to be integrated into an LSI.

Further, referring to FIG. 1, a configuration of mounting the DTV module 1 and motherboard 101 to the receiver housing 104 will be described in detail.

Referring to FIG. 1, the DTV module 1 is mounted on the motherboard 101, on which the front-end circuit 102 for each country and area, the socket 105 for connecting the CA module for each market thereto and the AV output circuit 106 for outputting a video signal and an audio signal to an external device are mounted. On the motherboard 101, a plurality of lands (not shown), that are connection terminals corresponding to an arrangement of the plurality of solder balls 9 on the back surface of the DTV module 1, are formed. The motherboard 101 and the DTV module 1 are physically combined with each other and electrically connected to each other, by means of a reflow process. The motherboard 101, to which the DTV module 1 is combined and connected, is incorporated into the receiver housing 104 together with the power-supply unit 103.

As shown in FIGS. 2 and 3, memories formed by, for example, DRAMs, such as the memories 4 and 10 having a large operating speed are mounted on the DTV module 1. Accordingly, only components having smaller operating speeds are mounted on the motherboard 101. In a television receiver according to the prior art in which the DTV module is not used, components were disposed on a common print wiring substrate, and a performance of the print wiring substrate was determined by a memory having a largest operating speed. Accordingly, a substrate having a small dielectric constant was conventionally used. However, a print substrate having a large dielectric constant and having a low performance can be used as the motherboard 101, and this leads to the cost reduction. In other words, the motherboard 101 is preferably formed by a dielectric substrate having a dielectric constant larger than a dielectric constant of a dielectric substrate of the DTV module 1.

Versatile print wiring substrates, such as a glass epoxy substrate and a paper epoxy substrate, have a large dielectric constant and are relatively inexpensive. On the other hand, print wiring substrates, such as a small-dielectric-constant epoxy substrate and a fluorine substrate, have a small dielectric constant and are relatively expensive. In addition, a transmission speed of the electric signal in a print wiring substrate is larger as the dielectric constant of the print wiring substrate is smaller. Accordingly, a higher-performance print wiring substrate having a smaller dielectric constant is used as the DTV module 1 on which the components having the larger operating speeds are mounted, and an inexpensive print wiring substrate having a larger dielectric constant is used as the motherboard 101 on which the components having the larger operating speeds are not mounted. By properly using print wiring substrates different in material and performance as the DTV module 1 and the motherboard 101, the performance can be secured and the cost reduction is achieved. In the present preferred embodiment, as shown in FIG. 2, components having the relatively large operating speeds and mounted on the DTV module 1 mainly include an LSI and memories having clock frequencies of at least 100 MHz such as the decoder LSI 2 and the working memories 4 for the decoder LSI 2. On the other hand, as shown in FIG. 5, components having the relatively small operating speeds and mounted on the motherboard 101 mainly include circuits having clock frequencies of at most 100 MHz such as the front-end circuit 102 and the CA module.

In addition, by preparing the motherboard 101 having the lands corresponding to the solder balls 9 of the DTV module 1 for each country, area and market, it is possible to connect the motherboard 101 to the DTV module 1 so as to manufacture a television receiver for each country, area and market. In the present preferred embodiment, the DTV module 1 and the motherboard 101 are connected to each other by means of the reflow process using the solder balls 9 and the lands. However, the present invention is not limited to this. A connection method using a connector or a cable may be employed, as far as the DTV module 1 and the motherboard 101 are physically combined with each other and electrically connected to each other.

Figure 5:
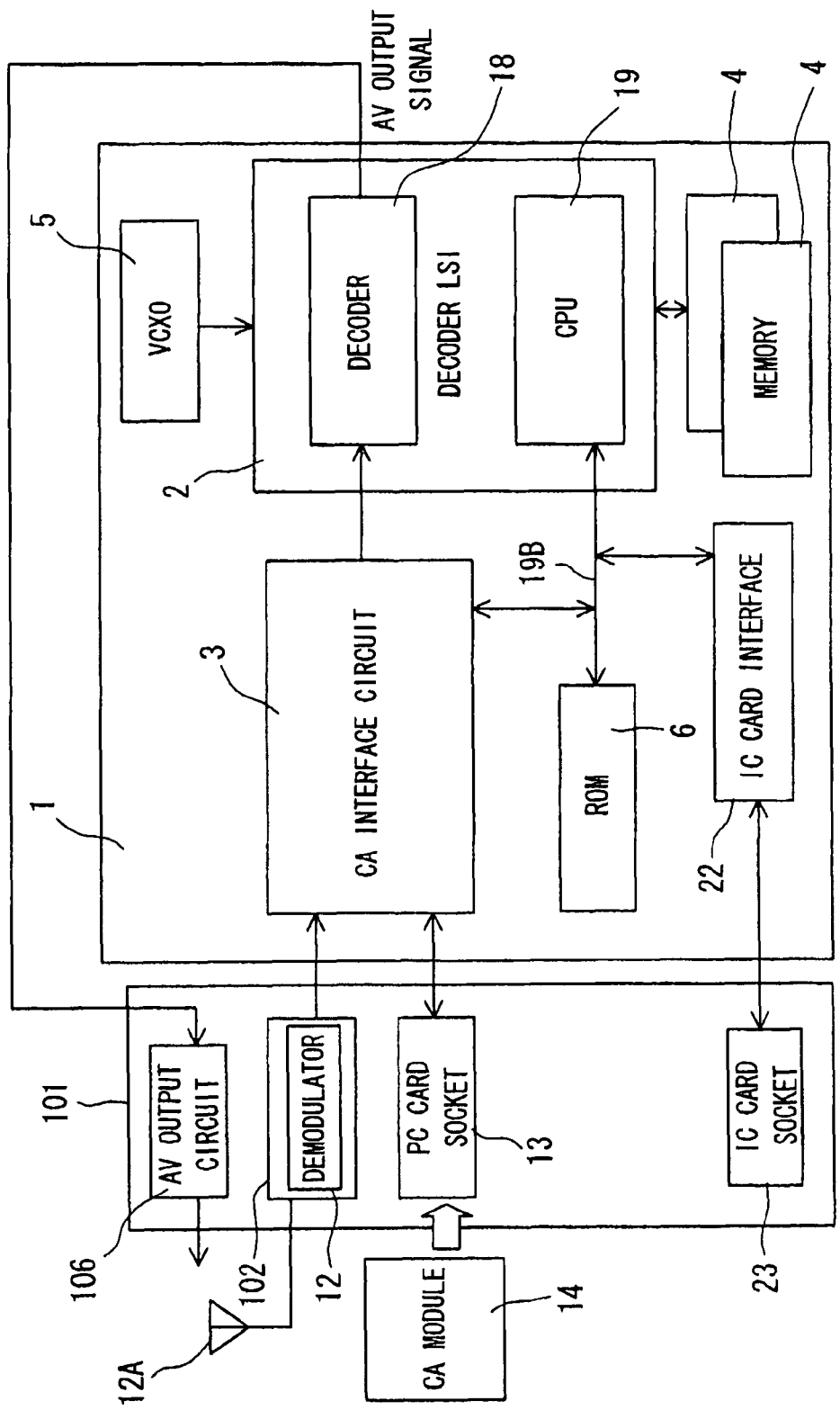
FIG. 5 is a block diagram showing a configuration of a system including the DTV module 1 and the motherboard 101 shown in FIG. 1.

FIG. 5 is a block diagram showing a configuration of a system including the DTV module 1 and the motherboard 101 shown in FIG. 1. A system configuration of the DTV module 1 is described below, with reference to FIG. 5.

Referring to FIG. 5, the front-end circuit 102 including both of a tuner (not shown) connected to an antenna 12A and the demodulator 12, a PC card socket 13, an IC card socket 23, and the AV output circuit 106 are mounted on the motherboard 101. In this case, only one of the PC card socket 13 and the IC card socket 23 may be mounted on the motherboard 101. In addition, the decoder LSI 2 which includes a decoder 18 and a CPU 19, the CA interface circuit 3, the memories 4, the VCXO 5, the ROM 6 and an IC card interface 22 are mounted on the DTV module 1. In this case, the VCXO 5 and the memories 4 are connected to the decoder LSI 2, and the CPU 19, CA interface circuit 3, ROM 6 and IC card interface 22 are connected to each other via a bus 19B.

The front-end circuit 102 of the motherboard 101 is constructed by including the tuner (not shown) connected to the antenna 12A and the demodulator 12. The tuner of the front-end circuit 102 receives a digital television broadcast wave via the antenna 12A, and converts a received digital television broadcast wave into a predetermined intermediate frequency signal. The demodulator 12 demodulates a frequency-converted intermediate frequency signal into an MPEG-2_TS signal and outputs the MPEG-2_TS signal to the CA interface circuit 3 in the DTV module 1. In the DTV module 1, it is ensured that the DTV module 1 operates under such a condition that an interface to the MPEG-2_TS signal is physically and electrically connected thereto. Accordingly, the demodulator 12 can be directly connected to the CA interface circuit 3, whether the demodulator 12 is a demodulator conforming to the DVB-T system using the QAM system, a demodulator conforming to the ISDB-T system using the QAM system or a demodulator conforming to the ATSC system using the VSB system.

The socket 105 shown FIG. 2 includes the PC card socket 13 and the IC card socket 23. The PC card socket 13 is a socket into which the CA module 14 is inserted. The CI card in the DVB-T system and the CableCARD in the Open Cable system have the same physical specifications (and have different electrical specifications), respectively. Accordingly, they can be inserted and connected to the same PC card socket 13. In the DTV module 1 according to the present preferred embodiment, connections to these CA modules 14 are physically and electrically ensured as described later, so that either of the CI card or the CableCARD can be directly inserted and connected to the DTV module 1. The DTV module 1 can be manufactured with ensuring the connection to the CA modules 14 in U.S.A. and Europe and the operation thereof.

The CA interface circuit 3, a circuit configuration of which will be described later in detail, is constructed by including a circuit whose operation is controlled by the CPU 19 and which inputs the MPEG-2_TS signal from the demodulator 12 and outputs a descrambled signal to the decoder 18, and an interface circuit for ensuring that the DTV module 1 operates under such a condition that the CA module 14 is electrically connected thereto. The MPEG-2_TS signal from the demodulator 12 is outputted to the CA module 14 via the PC card socket 13 and descrambled by the CA module 14. A descrambled MPEG-2_TS signal is outputted from the CA module 14 to the decoder 18 in the decoder LSI 2 via the PC card socket 13. In addition, the CA interface circuit 3 is also connected to the bus 19B of the CPU 19, in order to access a register or a memory in the CA module 14 in which an attribute thereof is written. In other words, the CA interface circuit 3 executes input and output processings on a plurality of signals communicated among the demodulator 12, CA module 14, decoder 18 and CPU 19, to the CA module 14.

The IC card socket 23 is a socket into which an IC card (not shown) is inserted. The CA module 14 of the ISDB-T system, which has the same physical and electrical specifications as those of the IC card, can be connected to the IC card socket 23. The IC card interface 22 is inserted between the IC card socket 23 and the bus 19B of the CPU 19, and executes electrical input and output interface processings on signals communicated between the IC card connected to the IC card socket 23 and the CPU 19. The IC card has eight terminals. The DTV module 1 can be manufactured with ensuring the connection to the CA module 14 in Japan and the operation thereof.

The decoder LSI 2 is constructed by including the decoder 18 and the CPU 19 that are hardware engines. The decoder LSI 2 inputs the MPEG-2_TS signal, decodes the MPEG-2_TS signal into video signal and audio signal, and outputs decoded video signal and audio signal. The decoder LSI 2 can be adapted to the differences among the MPEG-2 specifications in the DVB-T system, ATSC system and ISDB-T and the H.264 to be standardized in the future, so that the decoder LSI 2 can decode the MPEG-2_TS signal. The decoded video signal and audio signal are outputted to the external device via the AV output circuit 106.

The plurality of memories 4 are connected to the CPU 19 and the decoder 18 in the decoder LSI 2, and used as secondary cash memories of the CPU 19 and working memories of other application software. In addition, the plurality of memories 4 are used as working memories when of the decoder 18 executes the decoding processing. In addition, the VCXO 5 generates an MPEG-2 system clock of 27 MHz which is used by the decoder 18 and the like, and outputs a generated clock to the decoder LSI 2. Further, the ROM 6 memorizes a program code and data for operating the CPU 19 and is connected to the bus 19B of the CPU 19, so that the CPU 19 can read out the program code and data are read out from the ROM 6.

The DTV module 1 having above-mentioned configuration can ensure that the DTV module 1 solely physically and electrically connects to the CA module 14 and the demodulators 12 of the DVB-T system, ISDB-T system, ATSC system and Open Cable system, and operates with connected CA module 14 and demodulators 12. Further, the DTV module 1 can decode compressed video signal and audio signal in the DVB-T system, ISDB-T system, ATSC system and Open Cable system, and output decoded compressed video signal and audio signal.

Figure 6:
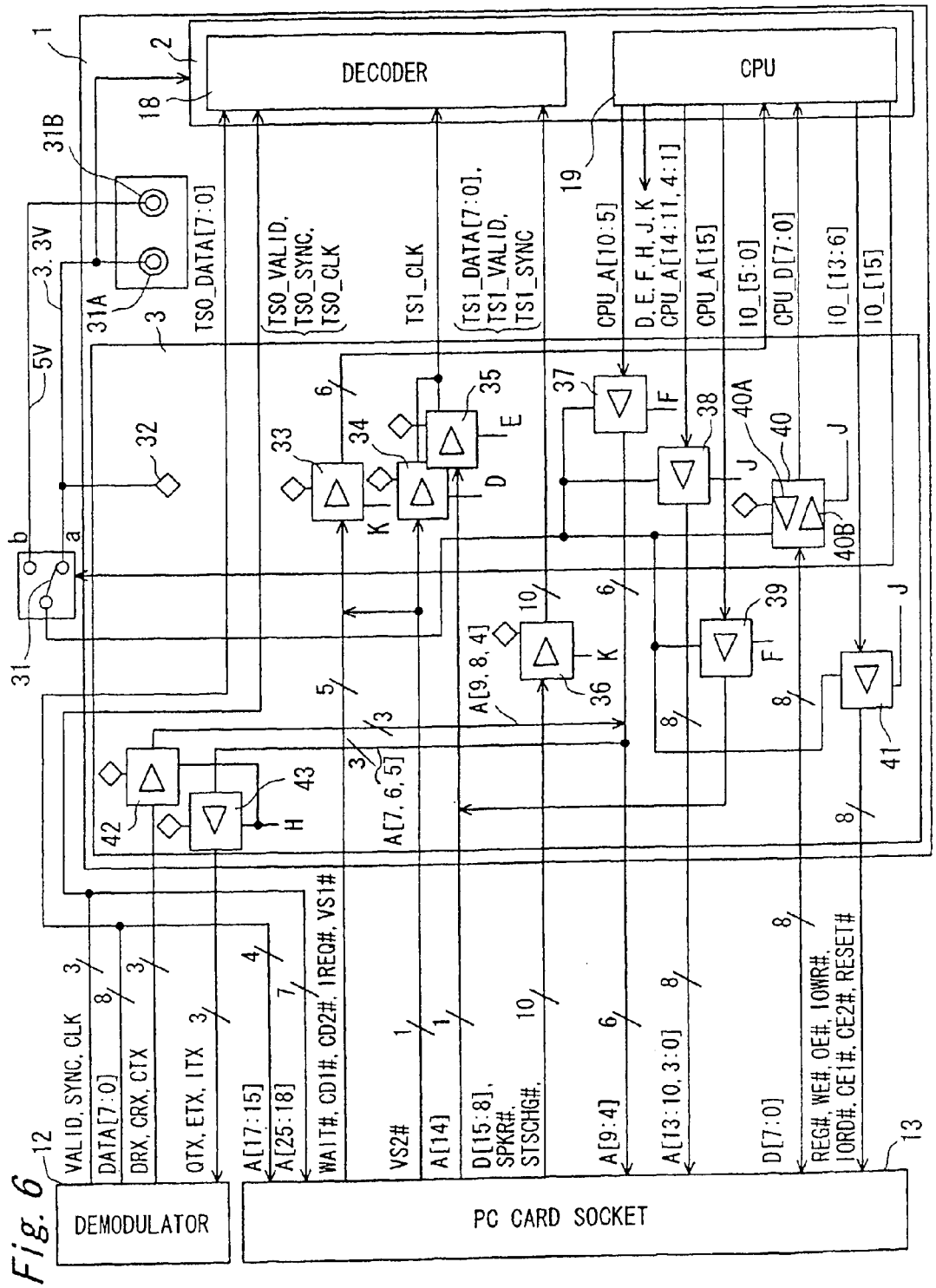
FIG. 6 is a circuit diagram showing a configuration of a CA interface circuit 3 formed on the DTV module 1 shown in FIG. 1.

FIG. 6 is a circuit diagram showing a configuration of the CA interface circuit 3 formed on the DTV module 1 shown in FIG. 1. In addition, FIG. 7 is a diagram showing a table of on-off states of enable control signals D, E, F, H, J and K supplied from the CPU 19 to buffers 33 to 43 shown in FIG. 6. Further, FIG. 8 is a diagram showing a table of power-supply voltages supplied to the buffers 33 to 43 shown in FIG. 6 and a PC card.

Symbols shown in each of the buffers 33 to 43 shown in FIG. 6 are described. Each of the symbols shown in each of the buffers 33 to 43 shows a circuit in which at least one buffer is connected in parallel. A number of buffers connected in parallel to each other is marked by a number of signal lines written near the signal lines shown in FIG. 6. In each triangle shown in each of the buffers 33 to 43, a vertex thereof having the sharpest angle shows an output side, an opposite side thereof relative to the vertex shows an input side, and a horizontal direction of the triangle shows a forward direction of a signal. A power-supply line is connected to an upside line of each of rectangles of the buffers 33 to 43 each containing the triangle. Signal lines of the enable control signals for controlling on-off states of outputs of the buffers 33 to 43 supplied from the CPU 19 are connected to downside lines of the rectangles.

Power-supply lines of the buffers 33, 34, 35, 36, 40, 42 and 43 among power-supply lines of the buffers 33 to 43 are connected to a power-supply terminal 31A of 3.3 V via a power-supply terminal 32 shown by ◇. The power-supply lines of the buffers 37, 38, 39, 40 and 41 connected to the PC card socket 13 are connected to an output terminal of a power-supply voltage switch 31. In addition, a power-supply voltage of 3.3 V is supplied to the decoder LSI 2 from the power-supply terminal 31A. The power-supply terminal 31A of 3.3 V is connected to a contact "a" side of the power-supply voltage switch 31, and a power-supply terminal 31B of 5 V is connected to a contact "b" side of the power-supply voltage switch 31. The switching of the power-supply voltage switch 31 is controlled by an IO_[15] signal which is a versatile IO of the CPU 19. In an initial state, the power-supply voltage switch 31 is switched over to the contact "a" side thereof, and when the power-supply voltage switch 31 is switched over to the contact "a" side thereof, the power-supply voltage of 3.3 V is supplied to the respective buffers 37, 38, 39, 40 and 41. On the other hand, when the power-supply voltage switch 31 is switched over to the contact "b" side thereof, the power-supply voltage of 5 V is supplied to the respective buffers 37, 38, 39, 40 and 41. The power-supply terminals 31A and 31B are connected to the power-supply unit 103 via the solder balls 9 of the DTV module 1 and the motherboard 101. The CPU 19 controls the power-supply voltage outputted to the buffers 37, 38, 39, 40 and 41 to be an appropriate power-supply voltage, according to setting information from the CA module 14 connected to the PC card socket or the motherboard 101, as is described later in detail.

When the enable control signals D, E, F, H, J and K to the buffers 33 to 43 are turned on, input signals inputted to the buffers 33 to 43 are outputted from the buffers 33 to 43 as they are. On the other hand, when the enable control signals D, E, F, H, J and K are turned off, the input signals inputted to the buffers 33 to 43 are not outputted, and the output terminals of the buffers 33 to 43 are put into a high impedance state. Namely, the output signals of the respective buffers 33 to 43 are turned on and off by the enable control signals D, E, F, H, J and K (expressed by such a description that the buffers 33 to 43 are turned on and off hereinafter). The respective enable control signals are outputted from the CPU 19 via the versatile IO port of the CPU 19. In this case, in FIG. 6, each of terminal names of the versatile IO port is shown by a bit number subsequent to a character string "IO_". Namely, in the specification and drawings of the present invention, for example, a character string IO_[13:6] shows signal bits from bits 6 to 13 of the IO port.

The connection to terminals of the PC card socket 13 shown in FIG. 6 is described with using an input and output to and from a 16-bit PC card and terminal names of pin assignment of a memory card defined in the Non-Patent Document 4, so as to make clear the physical connection.

The buffer 42 includes three circuits. DRX, CRX and CTX signals, which are control signals from the demodulator 12 conforming to the Open Cable system, are inputted to input terminals of the buffer 42, and output terminals thereof are connected to output terminals of the buffer 37 and address terminals A [9,8,4] of the PC card socket 13. The buffer 42 is turned on and off by the enable control signal H outputted from the CPU 19. In addition, the power-supply voltage of 3.3 V is supplied to the buffer 42. Details of the demodulator conforming to the Open Cable system are shown in the Non-Patent Document 4.

The buffer 43 includes three circuits. Input terminals of the buffer 43 are connected to terminals A [7,6,5] of the PC card socket 13 and the output terminals of the buffer 37. QTX, ETX and ITX signals, which are control signals to the demodulator 12 conforming to the Open Cable system, are outputted from output terminals of the buffer 43. The buffer 43 is turned on and off by the enable control signal H outputted from CPU 19. In addition, the power-supply voltage of 3.3 V is supplied to the buffer 43. When the demodulator 12 does not conform to the Open Cable system, both of the buffers 42 and 43 are turned off.

The buffer 33 includes six circuits. Input terminals of the buffer 33 are connected to terminals WAIT#, CD1#, CD2#, IREQ#, VS1# and VS2#, which are control signal terminals of the PC card socket 13, and output terminals thereof are connected to IO_[5:0], which is the versatile IO port of the CPU 19. A character "#" added to an end of the signal name indicates a low active signal. The buffer 33 is turned on and off by the enable control signal K outputted from the CPU 19. In addition, the power-supply voltage of 3.3 V is supplied to the buffer 33.

The buffer 34 includes one circuit. An input terminal of the buffer 34 is connected to the terminal VS2# of the PC card socket 13, and an output signal from an output terminal of the buffer 34 is outputted to the decoder 18 as a TS1_CLK signal which is a clock input signal in the MPEG-2_TS signal. The buffer 34 is turned on and off by the enable control signal D outputted from the CPU 19. The power-supply voltage of 3.3 V is supplied to the buffer 34.

The buffer 35 includes one circuit. An input terminal of the buffer 35 is connected to a terminal A [14] of the PC card socket 13, and an output signal from an output terminal of the buffer 35 is outputted to the decoder 18 as the signal TS1_CLK which is the clock input signal in the MPEG-2_TS signal. The buffer 35 is turned on and off by the enable control signal E outputted from the CPU 19. In addition, the power-supply voltage of 3.3 V is supplied to the buffer 35.

The buffer 36 includes ten circuits. Input terminals of eight circuits among the ten circuits included in the buffer 36 are connected to data terminals D [15:8] of the PC card socket 13, and output terminals thereof are connected to TS1_DATA [7:0] which is a data input signal in the MPEG-2_TS signal in the decoder 18. In addition, input terminals of two circuits among the ten circuits included in the buffer 36 are connected to terminals SPKR# and STSCHG# of the PC card socket 13, and output signals from output terminals of the two circuits are outputted to the decoder 18 as a signal TS1_VALID and a signal TS1_SYNC which are an effective signal and a synchronizing signal in the MPEG-2_TS signal. The buffer 36 is turned on and off by the enable control signal K outputted from the CPU 19. In addition, the power-supply voltage of 3.3 V is supplied to the buffer 36.

The buffer 37 includes six circuits. A [10:5] signals, which are address signals outputted from the CPU 19 are inputted to input terminals of the buffer 37, and output terminals of the buffer 37 are connected to address terminals A [9:4] of the PC card socket 13, three-bit output terminals of the buffer 42 and three-bit input terminals of the buffer 43. The buffer 37 is turned on and off by the enable control signal F outputted from the CPU 19. In addition, the power-supply voltage outputted from the power-supply voltage switch 31 is supplied to the buffer 37.

The buffer 38 includes eight circuits. A [14:11] signals and A [4:1] signals, which are address signals outputted from the CPU 19, are inputted to input terminals of the buffer 38, and output terminals thereof are connected to address terminals A [13:10] and A [3:0] of the PC card socket 13. The buffer 38 is turned on and off by the enable control signal J outputted from the CPU 19. In addition, the power-supply voltage outputted from the power-supply voltage switch 31 is supplied to the buffer 38.

The buffer 39 includes one circuit. An A [15] signal, which is an address signal outputted from the CPU 19, is inputted to an input terminal of the buffer 39, and an output terminal thereof is connected to the address A [14] of the PC card socket 13 and an one-bit input terminal of the buffer 35. The buffer 39 is turned on and off by the enable control signal F outputted from the CPU 19. In addition, the power-supply voltage outputted from the power-supply voltage switch 31 is supplied to the buffer 39.

In the connections of the address signals described above, the address signals of the CPU 19 are shifted to the higher order by one bit relative to the address signals of the PC card socket 13, because of a system configuration in which accessing word is carried out when the CPU 19 accesses the PC card or the like connected to the PC card socket 13. In case of accessing byte, instead of the word accessing, the address signals of the PC card socket 13 are connected to the address signals of the CPU 19 without shifting them to the higher order.

The buffer 40 includes eight circuits, and constructed by connecting bidirectional buffers in parallel to each other. In this case, the buffer 40 includes (a) a buffer 40A for executing a buffering processing in a direction from the CPU 19 toward the PC card socket 13 and (b) a buffer 40B for executing a buffering processing in a direction from the PC card socket 13 toward the CPU 19. A signal direction is controlled by a direction controlling signal (not shown) from the CPU 19. Input/output terminals of the buffer 40 on one end are connected to data terminals D [7:0] of the PC card socket 13, and input/output terminals of the buffer 40 on the other end are connected to data D terminals [7:0] of a data signal inputted to and outputted from the CPU 19. The output of the buffer 40 is turned on and off by the enable control signal J outputted from the CPU 19. Further, the power-supply voltage outputted from the power-supply voltage switch 31 is supplied to the buffer 40A, and the power-supply voltage of 3.3 V from the power-supply terminal 31A is supplied to the buffer 40B.

The buffer 41 includes eight circuits. IO_[13:6] signals from the general-purpose 10 port of the CPU 19 are inputted to input terminals of the buffer 41, and output terminals thereof are connected to terminals REG#, WE#, OE#, IOWR#, IORD#, CE1#, CE2# and RESET of the PC card socket 13. The buffer 41 is turned on and off by the enable control signal J outputted from the CPU 19. In addition, the power-supply voltage outputted from the power-supply voltage switch 31 is supplied to the buffer 41.

In the CA interface circuit 3 configured as described-above, at first, the MPEG-2_TS signal outputted from the demodulator 12 is inputted to the CA module 14 via the PC card socket 13 and descrambled in the CA module, and thereafter a descrambled MPEG-2_TS signal is outputted to the decoder 18. A non-scrambled MPEG-2_TS signal such as a clear channel may be outputted to the decoder 18 not via the CA module 14. When the MPEG-2_TS signal is descrambled by means of the IC card instead of the CA module 14 as in the ISDB-T system, the MPEG-2_TS signal may be outputted to the decoder 18 without the intervention of the CA module 14. In order to allow a path to be selected, an effective signal VALID, a synchronizing signal SYNC and a clock signal CLK, which are control signals in the MPEG-2_TS signal outputted from the demodulator 12, are outputted to terminals A [25:18] of the PC card socket 13, and outputted to the decoder 18 as an effective signal TS0_VALID, a synchronizing signal TS0_SYNC and a clock signal TS0_CLK, which are control signals in the MPEG-2_TS signal. Data output signals DATA [7:0] in the MPEG-2_TS signal outputted from the demodulator 12 are outputted to terminals A [17:15] of the PC card socket 13, and outputted to the decoder 18 as data input signals TS0_DATA [7:0] in the MPEG-2_TS signal. In this case, because the CPU 19 can previously recognize whether or not the MPEG-2_TS signal outputted from the demodulator 12 is a non-scrambled clear channel, based on program information or the like, the CPU 19 sets the decoder 18 so that one of a TS0 signal system and a TS1 signal system is selected according to the recognition.

Further, in FIG. 6, terminals IOIS16#, INPACK# and VPP of the terminals of the PC card socket 13 are not particularly related to the present invention, and are not described here. In addition, the power-supply voltage outputted from the power-supply voltage switch 31 is supplied to a power-supply terminal Vcc in the PC card socket 13. In addition, pull-up resistances are connected to the terminals CD1#, CD2#, VS1# and VS2# of the PC card socket 13 between each of those terminals and the power-supply terminal Vcc.

The names of the signal connected to the decoder LSI 2 and the names of the signals VALID, SYNC, CLK and DATA [7:0] connected to the demodulator 12 are merely examples for explanation, and they are not signals particularly defined in any standard.

Next, the enable control signals D, E, F, H, J and K outputted from the CPU 19 to the buffers 34 to 43 are described below with reference to FIG. 7. FIG. 7 is a table showing settings of the respective enable control signals D, E, F, H, J and K relative to types and states of the CA module 14 inserted into the PC card socket 13. FIG. 7 shows on-off settings of the buffers 33 to 43 set by the enable control signals D, E, F, H, J and K.

As shown in FIG. 7, in a state that the CA module 14 is not inserted, the buffer 33, to which the enable control signal K is inputted, is controlled to be turned on, and the buffers 34 to 43, to which the enable control signals other than the enable control signal K, that are the enable control signals D, E, F, H and J, are controlled to be turned off. An object of the above-mentioned control is to prevent the buffers 34 to 43 from being turned on when the CA module 14 is inserted. The CPU 19 can detect whether or not the CA module 14 is inserted by monitoring a signal level of the terminal CD1# or CD2# via the buffer 33. An attribute of the card is written in a memory of the CA module 14. Accordingly, after the insertion of the CA module 14, the CPU 19 can recognize whether or not the CA module 14 is the CI card or whether or not the CA module 14 is the CableCARD, by reading out the attribute via the buffer 40. The DTV module 1 inputs a signal indicating the attribute of the CA module 14 from the motherboard 101. The CPU 19 can recognize a country, an area and a market by identifying types of inserted CA module 14.

Namely, in the state that the CA module 14 is not inserted, the buffers 33 and 36 are turned on, so as to output the WAIT#, CD1#, CD2#, IREQ#, and VS1# signals, which are the control signals from the PC card socket 13 to the CPU 19 via the buffer 33 as input/output signals IO_[5:0]. In addition, signal terminals D [15:8], SPKR# and STSHG#, which are terminals of data signals and control signals from the PC card socket 13, are connected to signal terminals TS1_DATA [7:0], TS1_VALID, and TS1_SYNC of the decoder 18 via the buffer 36. With this configuration, data signals and control signals from the CA module 14 can be transmitted to the decoder 18.

When the CI card is inserted into the PC card socket 13, the buffers 33 and 34 are turned on, and the buffer 35 is turned off. At this time, the VS2# terminal of the PC card socket 13 is connected to the terminal TS1_CLK of the decoder 18 via the buffer 34 so as to supply a clock signal to the signal terminal TS1_CLK. In addition, the buffer 37 is turned on, and the buffer 42 is turned off. At this time, the terminals CPU_A [10:5] of the CPU 19 are connected to the terminals A [9:4] of the PC card socket 13 via the buffer 37. In addition, the buffer 39 is turned on, and at this time, the terminal CPU_A [15] of the CPU 19 is connected to the terminal A [14] of the PC card socket 13 via the buffer 39. In addition, the address signals and data signals from the CPU 19 are outputted to the PC card socket 13, since the buffer 40 is turned on.

In an initial state (also referred to as a memory state) of the CableCARD when the CableCARD is inserted into the PC card socket 13, the buffers 34 and 35 are turned off, and the terminal TS1_CLK of the decoder 18 is not connected to the PC card socket 13. In addition, the buffer 37 is turned on, and the buffer 42 is turned off. At this time, the terminals CPU_A [10:5] of the CPU 19 are connected to the terminals A [9:4] of the PC card socket 13 via the buffer 37. In addition, the buffer 39 is turned on, and at this time, the terminal CPU_A [15] of the CPU 19 is connected to the A [14] of the PC card socket 13 via the buffer 39. Further, the buffer 40 is turned on so as to output the address signals and the data signals from the CPU 19 to the PC card socket 13.

The CableCARD becomes in an operating state, when the CPU 19 executes a known "personality change" processing for changing a state of the CableCARD, that is the PC card, to the operating state, and when the CableCARD is inserted into the PC card socket 13 and in the initial state. This state transition of the CableCARD is described in the Non-Patent Document 2. When the CableCARD is in the operating state, the buffer 34 is turned off, and the buffer 35 is turned on. At this time, the terminal A [14] of the PC card socket 13 is connected to the terminal TS1_CLK of the CPU 19 via the buffer 35, so as to output a clock signal from the PC card socket 13 to the decoder 18 as the TS1_CLK. In addition, the buffers 37 and 39 are turned off, and at hit time, the terminal CPU_A [15] of the CPU 19 is not connected to the terminal A [14] of the PC card socket 13, and the terminals CPU_A [10:5] of the CPU 19 are not connected to the terminals A [9:4] of the PC card socket 13. Further, the buffers 42 and 43 are turned on, and the DRX, CRX and CTX signals, which are the control signals from the demodulator 12, are outputted to the terminals A [9,8,4] of the PC card socket 13 via the buffer 42. In addition, the QTX, ETX and ITX signals, which are the control signals from terminals A [7,6,5] of the PC card socket 13, are outputted to the demodulator 12 via the buffer 43.

Next, control of the power-supply voltages supplied to the respective buffers 37 to 41 and control of the power-supply voltage supplied to the power-supply terminal Vcc of the PC card socket 13, which are executed by the CPU 19, are described with reference to FIG. 8. FIG. 8 is a table showing settings of the power-supply voltage switch 31 relative to the types and states of the CA modules 14 inserted into the PC card socket 13. In FIG. 8, the power-supply voltages outputted from the power-supply voltage switch 31 to the buffers 37 to 41 and the power-supply terminal Vcc of the PC card socket 13 are shown.

As shown in FIG. 8, when the CA module 14 is not inserted into the PC card socket 13, the power-supply voltage of 3.3 V is supplied. In addition, when the CI card is inserted into the PC card socket 13, the power-supply voltage of 5 V is supplied. Further, when the CableCARD is inserted into the PC card socket 13, the power-supply voltage of 3.3 V is supplied.

Figure 9:
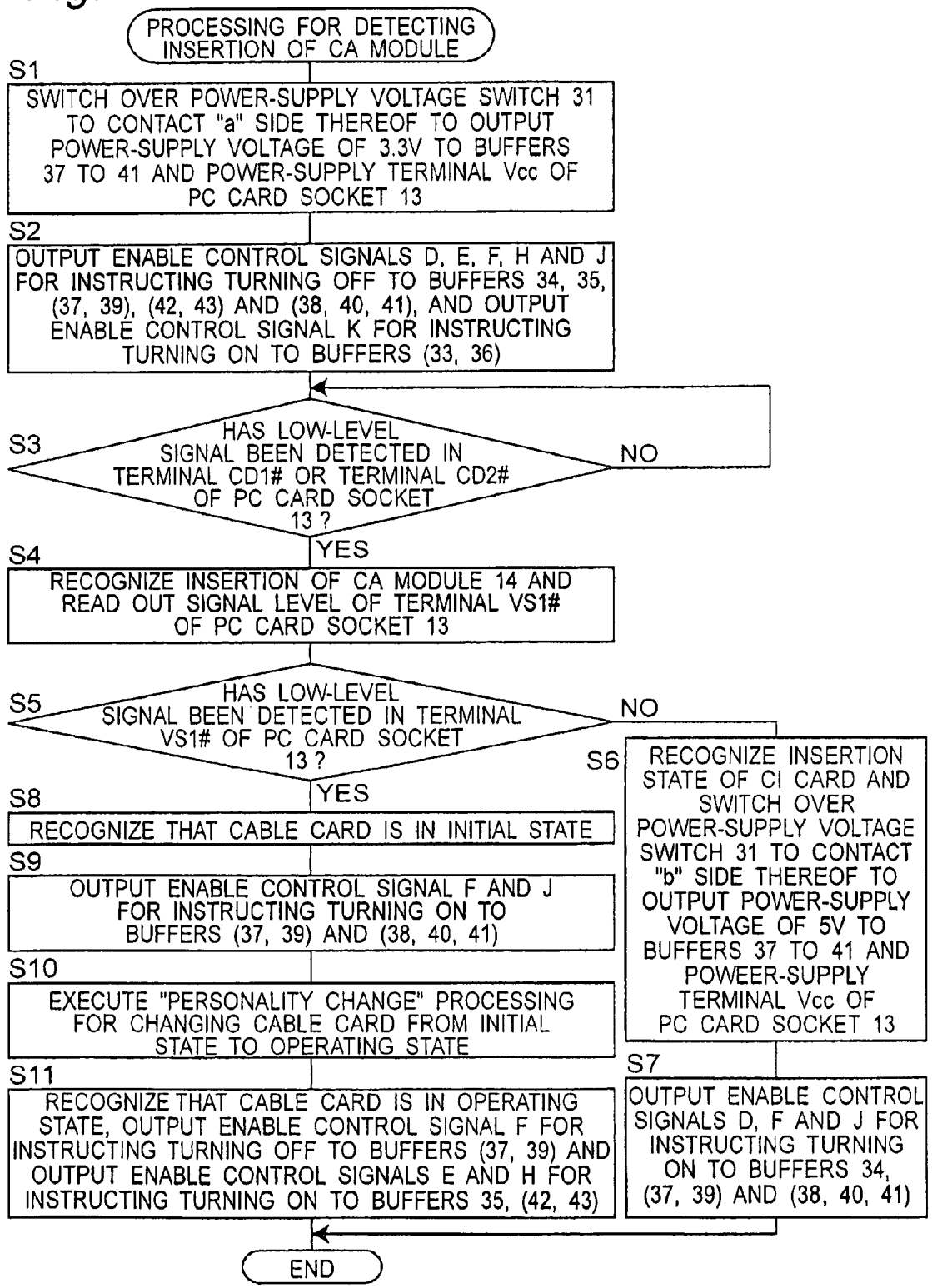
FIG. 9 is a flow chart showing a processing for detecting insertion of a CA module executed by the CPU 19 shown in FIG. 6.

FIG. 9 is a flow chart showing a processing for detecting insertion of the CA module executed by the CPU 19 shown in FIG. 6.

Referring to FIG. 9, at first, at step S1, the power-supply voltage switch 31 is switched over to the contact "a" side thereof to output the power-supply voltage of 3.3 V to the buffers 37 to 41 and the power-supply terminal Vcc of the PC card socket 13. Next, at step S2, the enable control signals D, E, F, H and J for instructing turning off are outputted to the buffers 34, 35, (37, 39), (42, 43) and (38, 40, 41), respectively, and the enable control signal K for instructing turning on is outputted to the buffers (33, 36). Then, at step S3, it is judged whether or not a low-level signal has been detected in the terminals CD1# and CD2# of the PC card socket 13, and the processing of step S3 is repeated until YES is obtained. If YES at step S3, the insertion of the CA module 14 is recognized, and the signal level of the terminal VS1# of the PC card socket 13 is read out at step S4. Then, at step S5, it is judged whether or not the low-level signal has been detected in the terminal VS1# of the PC card socket 13. If YES at step S5, the control flow goes to step S8, and if NO at step S5, the control flow goes to step S6.

At step S6, the insertion state of the CI card is recognized, and the power-supply voltage switch 31 is switched over to the contact "b" side thereof so that the power-supply voltage of 5 V is outputted to the buffers 37 to 41 and the power-supply terminal Vcc of the PC card socket 13. At step S7, the enable control signals D, F and J for instructing turning on are outputted to the buffers 34, (37, 39) and (38, 40, 41), respectively, thus finishing the processing.

At step S8, it is recognized that the CableCARD is in the initial state. At step S9, the enable control signals F and J for instructing turning on are outputted to the buffers (37, 39) and (38, 40, 41), respectively. Next, at step S10, the "personality change" processing for changing the state of the CableCARD from the initial state to the operating state is executed. At step S11, it is recognized that the CableCARD is in the operating state, the enable control signal F for instructing turning off is outputted to the buffers (37, 39), and the enable control signals E and H for instructing turning on are outputted to the buffers 35 and (42, 43), respectively, thus finishing the processing.

By executing the foregoing processing for detecting the insertion of the CA module, the type of the CA module 14 inserted into the PC card socket 13 can be detected, appropriate enable control signals D, E, F H and J can be set, and the power-supply voltages can be set. The specifications of the terminals CD1#, CD2# and VS1# of the PC card socket 13 are described in the Non-Patent Document 4.

As described above, according to the system configuration and buffer control in the CA interface circuit 3 of the present preferred embodiment, the connection between the decoder LSI 2 and the PC card socket 13 and the power-supply voltage level in the connection can be appropriately set in the cases in which the CI card or the CableCARD is inserted and not inserted into the PC card socket 13.

As described above, according to the DTV module 1 including the CA interface circuit 3 of the present preferred embodiment, it is possible to adapt the DTV module 1 to the electrical specifications of the front-end circuits for the respective countries and areas and that of the CA modules 14 of the respective markets. Accordingly, the DTV module 1 can be directly connected to the front-end circuits 102 of the respective countries and areas and the CA modules 14 of the respective markets. The DTV module 1 can be manufactured with ensuring the operation thereof after the connection and with a reduced cost, size and weight, as compared the prior art. Accordingly, when the manufacturers of the digital television receiver uses the DTV module 1 according to the present invention, they can easily manufacture the digital television receivers for the respective countries, areas, and markets, by designing the motherboard 101 on which a module of the front-end circuit 102 for the respective countries and areas and PC card socket 13 of the CA modules 14 for the respective markets are mounted, with a reduced cost, size and weight, as compared the prior art.

Second Preferred Embodiment

Figure 10:
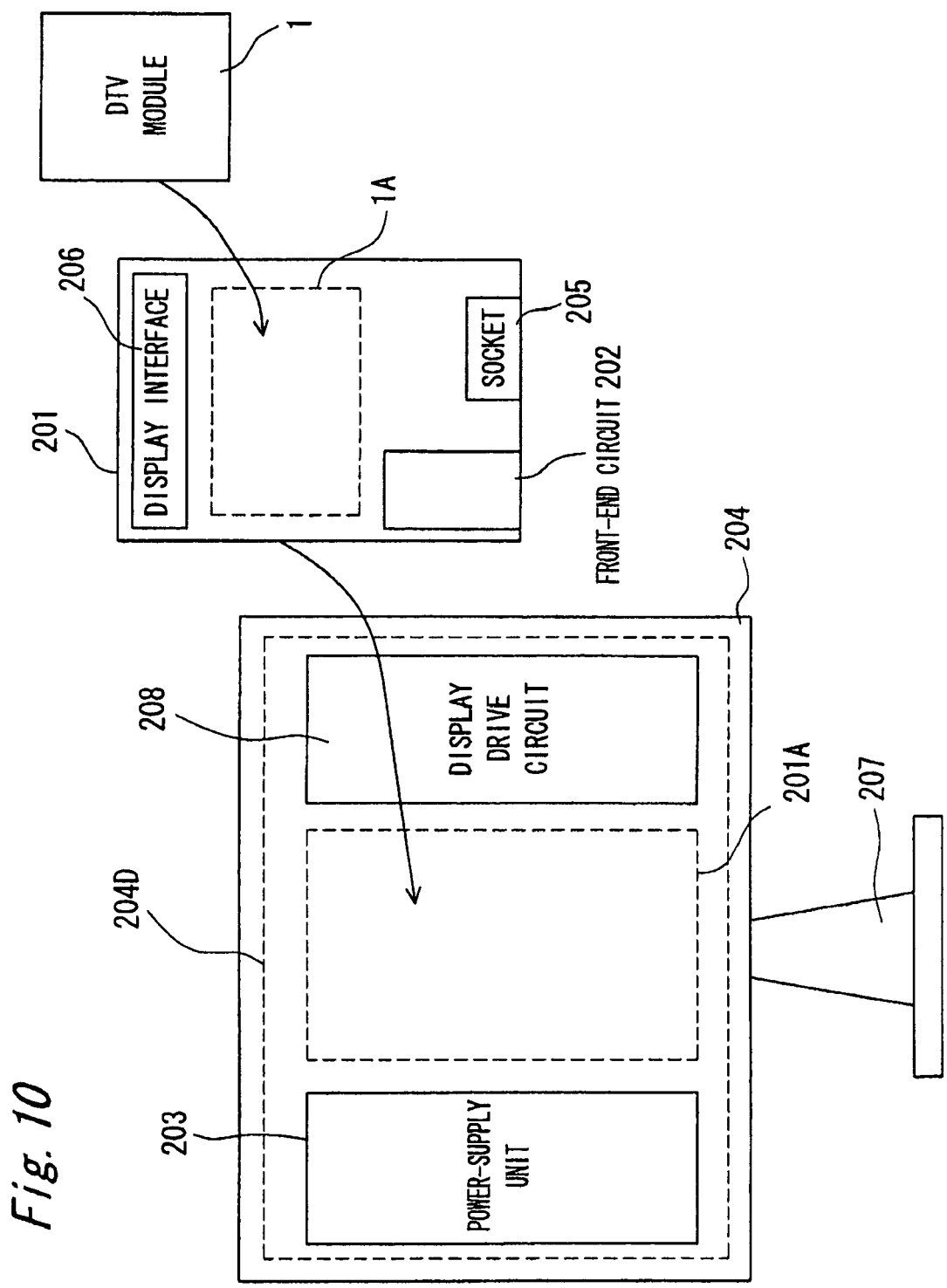
FIG. 10 is a partially exploded rear view showing a configuration of a television receiver according to a second preferred embodiment of the present invention.

FIG. 10 is a partially exploded rear view showing a configuration of a television receiver according to a second preferred embodiment of the present invention. In the second preferred embodiment, the configuration of the DTV module 1 described with reference to FIGS. 2 to 4 and the configuration of the CA interface circuit 3 described with reference to FIG. 6 are the same as those according to the first preferred embodiment, and will not be described. In addition, in the following description which refers to new drawings, descriptions of parts similar to those in the first preferred embodiment will be omitted.

The television receiver according to the second preferred embodiment is characterized by mounting the DTV module 1 according to the first preferred embodiment and being equipped with a display 204D such as a liquid crystal display or a plasma display. It is noted that FIG. 10 is the rear view, and the display 204D is mounted on the front surface, which is the reverse side of FIG. 10, of the television receiver.

Referring to FIG. 10, the DTV module 1 is mounted on a motherboard 201, on which a front-end circuit 202 for each country and area, a socket 205 for connecting the CA module 14 for each market, and a display interface 206 for outputting a digital video signal and one of a digital audio signal and an analog audio signal are mounted. The display interface 206 is an interface for connecting the video signal and the audio signal outputted from the DTV module 1 to a connected display such as the liquid crystal display, PDP display or CRT display. The display interface 206 is realized using a circuit which is designed according to connection specifications on the display side. The audio signal is outputted to the display or a loudspeaker provided outside the display. A plurality of lands corresponding to the location of the plurality of solder balls 9 are formed on the motherboard 201, and the motherboard 201 and the DTV module 1 are physically and electrically connected to each other by means of the reflow process. The motherboard 201, to which the DTV module 1 is connected, is incorporated into a housing of the television receiver 204 supported by an unipod 207 together with a power-supply unit 203 and a display drive unit 208. The display interface 206 is connected to the display 204D via the display drive circuit 208.

The DTV module 1 according to the present preferred embodiment can be realized by a DTV module which is the same as the DTV module 1 according to the first preferred embodiment. Accordingly, when television receivers having different display devices such as a liquid crystal television receiver, a plasma television receiver or a CRT television receiver and a set-top box are manufactured in the same country, area and market, the television receivers including the respective display devices can be manufactured by preparing the motherboard 201 having the lands corresponding to the DTV module 1 for each of the display devices and by connecting a prepared DTV module to the motherboard 201. Television receivers including the respective display devices can be manufactured in the respective countries, areas and markets, in a manner similar to the above-mentioned manner.

In the present preferred embodiment, the DTV module 1 and the motherboard 201 are connected to each other by means of the reflow process using the solder balls 9 and the lands. However, the present invention is not limited to this. A connection method using a connector or a cable may be employed, as far as the DTV module 1 and the motherboard 201 are physically and electrically connected to each other.

Figure 11:
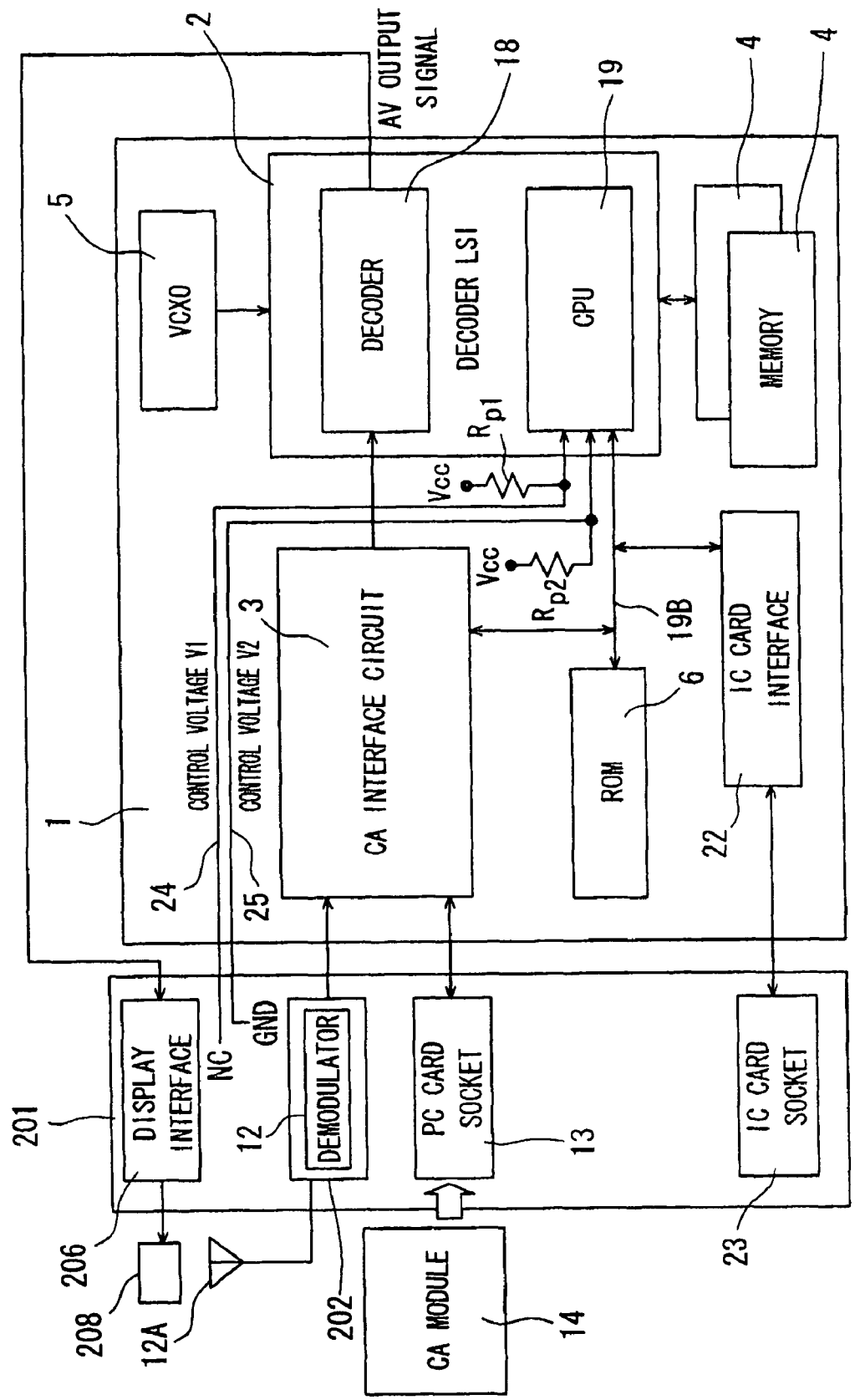
FIG. 11 is a block diagram showing a configuration of a system including the DTV module 1 and a motherboard 201 shown in FIG. 10.

FIG. 11 is a block diagram showing a configuration of a system including the DTV module 1 and the motherboard 201 shown in FIG. 10. Differences between the system configuration shown in FIG. 11 and the system configuration shown in FIG. 5 are described below.

Referring to FIG. 11, the motherboard 201 is constructed by including the front-end circuit 202 including the tuner (not shown) connected to the antenna 12A and the demodulator 12, the PC card socket 13 into which the CA module 14 is inserted, an IC card socket 23 and the display interface 206. In this case, only one of the PC card socket 13 and the IC card socket 23 may be mounted. The front-end circuit 202 is configured in a manner similar to that of the front-end circuit 102.

Signal lines 24 and 25 of control voltages V1 and V2 which is inputted to the CPU 19 are connected to the power-supply terminal Vcc of a voltage source of 3.3 V via pull-up resistances Rp1 and Rp2, respectively, so as to be pulled up, and the signal lines 24 and 25 are connected to the motherboard 201 via the solder balls 9 on the reverse surface of the DTV module 1. The motherboard 201 can set each of the control voltages V1 and V2 to "0" which is a low-level (corresponding to voltage of 0 V) or "1" which is a high level (corresponding to voltage of 3.3 V) by connecting or non-connecting (NC) each of the control voltages to a ground conductor (GND). In an example shown in FIG. 11, the control voltage V1 is set to "1", and the control voltage V2 is set to "0". The motherboard 201 can set four operating modes in the CPU 19 according to combinations of the two control voltages V1 and V2. Namely, the CPU 19 can use the two control voltages V1 and V2 as classification or type-identifying data signals for identifying a type of the motherboard 201. For example, the CPU 19 can distinguish a motherboard 201 for Europe using the DVB-T system, a motherboard 201 for Japan using the ISDB-T system, a motherboard 201 for U.S.A. using the ATSC system and the Open Cable system and a motherboard 201 for China using the DVB-T system from each other. In this case, because the motherboard 201 is changed according to the type of the front-end circuit 202, the type of the motherboard 201 is changed according to a system of a digital television signal received and outputted by the front-end circuit 202. Accordingly, the CPU 19 can identify a broadcasting system of a digital television signal inputted to the decoder 18, in addition to the type of the motherboard, by using the two control voltages V1 and V2.

Figure 12:
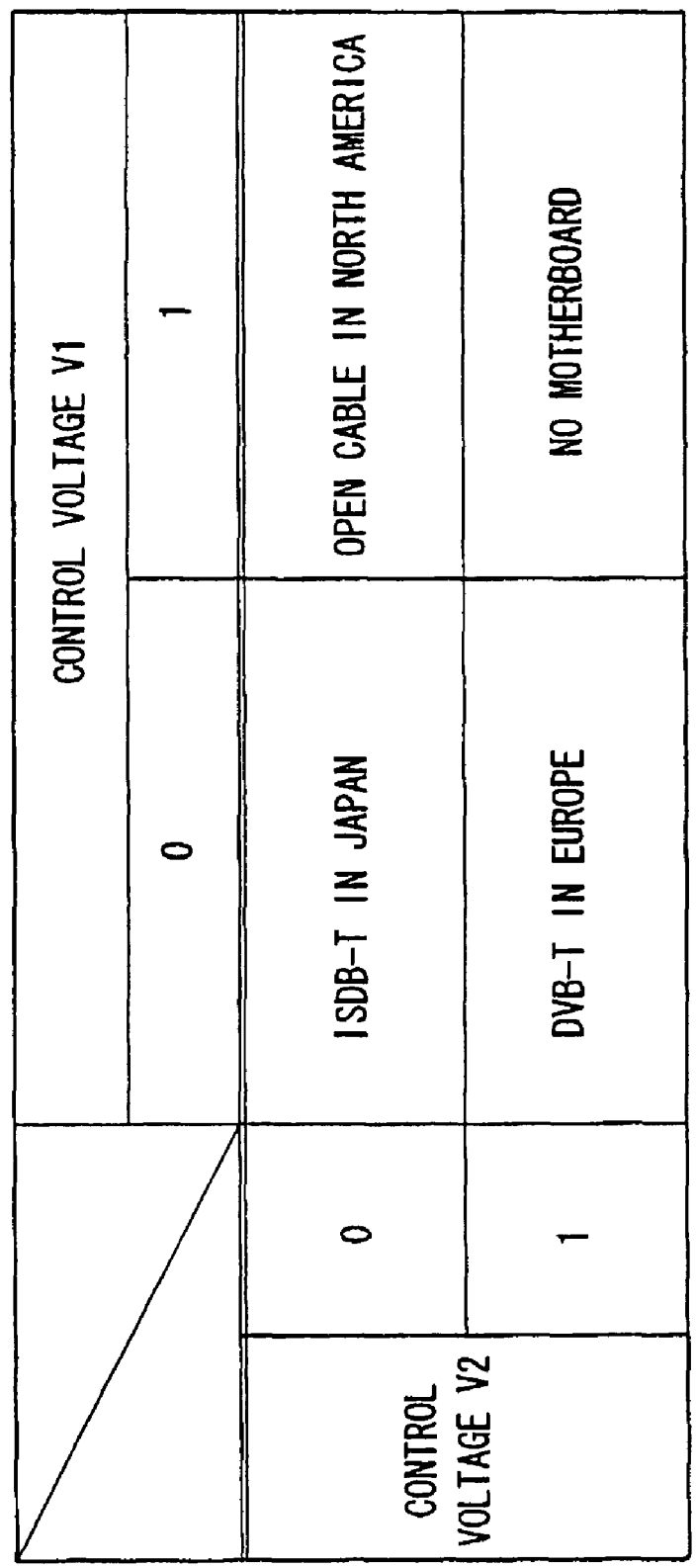
FIG. 12 is a diagram showing a table of set values of control voltages V1 and V2 shown in FIG. 11.

FIG. 12 is a diagram showing one example of a table of set values of the control voltages V1 and V2 shown in FIG. 11. Referring to FIG. 12, in the motherboard 201 for Japan (formed conforming to the ISDB-T system), the control voltage V1 is set to "0", and the control voltage V2 is set to "0". In addition, in the motherboard 201 for North America for the ATSC system and the Open Cable system (formed conforming to the ATSC system and the Open Cable system), the control voltage V1 is set to "1", and the control voltage V2 is set to "0". Further, in the motherboard 201 for Europe for the DVB-T system (formed conforming to the DVB-T system), the control voltage V1 is set to "0", and the control voltage V2 is set to "1". Still further, when the control voltage V1 is set to "1" and the control voltage V2 is set to "1", the CPU 19 judges that the motherboard 201 is not connected thereto. In this case, when the motherboard 201 is mounted on the DTV module 1, the CPU 19 recognizes that the type of the motherboard 201 is changed, by detecting that the control voltages V1 and V2 are changed from "1", respectively. Then, the CPU 19 reads out the control voltages V1 and V2, and sets operation modes of the decoding system of the decoder LSI 2 and the interface processing of the CA interface circuit 3, according to the levels of the control voltages.

In the present preferred embodiment, the two control voltages V1 and V2 are used as the type-identifying data signals for identifying the type of the motherboard and the broadcasting system of an inputted digital television signal. However, there is no limit to a number of the control voltages and the type and number of the motherboards to be identified. For example, three control signals may be used so that the motherboards 201 of the liquid crystal display, plasma display, CRT display or the set-top box may be distinguished from each other. In addition, the motherboard 201 may mount a memory for memorizing classification data for identifying the type of the motherboard 201 and the broadcasting system of the inputted digital television signal, and the CPU 19 may identify the type of the motherboard 201 and the broadcasting system of the inputted digital television signal, by reading out the classification data from the memory, after the memory and the CPU 19 are connected to each other. In addition, the classification data for identifying the type of the motherboard 201 and the broadcasting system of the inputted digital television signal may not be stored on the motherboard 201, and may be stored in a memory provided in a substrate connected to the motherboard 201, which is not shown, or in a memory provided in the CA module 14 connected to the PC card socket 13. Namely, the classification data for identifying the motherboard 201 and the broadcasting system of the inputted digital television signal is stored in an external apparatus of the DTV module 1, and the CPU 19 identifies the type of the motherboard 201 and the broadcasting system of the inputted digital television signal, by connecting the motherboard 201 so as to access such a memory storing the classification data.

The DTV module 1 having above-mentioned configuration can ensure that the DTV module 1 solely physically and electrically connects to the CA module 14 and the demodulators 12 of the DVB-T system, ISDB-T system, ATSC system and Open Cable system, and operates with connected CA module 14 and demodulators 12. Further, the DTV module 1 can decode compressed video signals and audio signals in the DVB-T system, ISDB-T system, ATSC system, Open Cable system, and the like, and output decoded compressed video signals and audio signals. In addition, the DTV module 1 can be connected to the motherboards of the liquid crystal display, plasma display, CRT display and set-top box, so that television receivers of respective display devices can be manufactured. Accordingly, when the manufactures of the digital television receiver use the DTV module 1 according to the present preferred embodiment, they can easily manufacture digital television receivers each including each of display devices for each of the countries, areas and markets, with reduced cost, size and weight as compared with the prior art, by designing the motherboard 201 on which a module of the front-end circuit 202 for each of the countries and areas, a PC card socket 13 or IC card socket 23 for the CA module 14 for each of the markets, and interface 201 for each of the display devices are mounted.

FIG. 13 is a diagram showing a table of on-off states of the enable control signals D, E, F, H, J and K supplied from the CPU 19 to the buffers 33 to 43 in the system shown in FIG. 11 when the CA interface circuit 3 shown in FIG. 6 is used. In FIG. 13, settings of the enable control signals D, E, F, H, J and K corresponding to the types of the motherboards 201 connected to the DTV module 1 and the types and states of the CA module 14 inserted into the PC card socket 13 are shown. FIG. 13 shows on-off settings of the buffers 33 to 43 set by the enable control signals D, E, F, H, J and K.

Referring to FIG. 13, the buffers 34 to 43, to which the enable control signals D, E, F, H and J other than the enable control signal K are applied, are controlled to be turned off, when the motherboard 201 for Japan using the ISDB-T system is connected to the DTV module 1 (corresponding to the state that the CA module 14 is not inserted in the first preferred embodiment). One reason for the above-mentioned control is that the CA module 14 conforming to the ISDB-T system is not inserted into the PC card socket 13 but inserted into the IC card socket 23. Another reason for the above-mentioned control is to prevent the buffers from being turned on when a CA module 14 for different market is inserted into the PC card socket 13. The CPU 19 can detect whether or not the CA module 14 is inserted, by monitoring the signal level of the terminal CD1# or CD2# via the buffer 33. After the insertion of the CA module 14, the CPU 19 can recognize whether or not the CA module 14 is the CI card or whether or not the CA module 14 is the CableCARD, by reading out the attribute via the buffer 40. The DTV module 1 inputs the signal indicating the attribute of the CA module 14 from the motherboard 201. By doing so, the CPU 19 can identify the type of the inserted CA module 14.

Because the CA interface circuit 3 shown in FIG. 6 is used also in the present preferred embodiment, concrete examples, in which the motherboards 201 of the respective systems are used, are described below with reference to FIG. 6.

When the motherboard 201 for Europe using the DBV-T system is connected to the DTV module 1 (corresponding to the state that the CI card is inserted in the first preferred embodiment), the buffers 33 and 34 are turned on, and the buffer 35 is turned off. In this case, the terminal VS2# of the PC card socket 13 is connected to the signal terminal TS1_CLK of the decoder 18 via the buffer 34 so as to supply the clock signal to the signal terminal TS1_CLK. In addition, the buffer 37 is turned on, and the buffer 42 is turned off. At this time, the terminals CPU_A [10:5] of the CPU 19 are connected to the terminals A [9:4] of the PC card socket 13 via the buffer 37. In addition, the buffer 39 is turned on, and at this time, the terminal CPU_A [15] of the CPU 19 is connected to the terminal A [14] of the PC card socket 13 via the buffer 39. In addition, the address signals and data signals from the CPU 19 are outputted to the PC card socket 13, since the buffer 40 is turned on.

When the motherboard 201 for U.S.A. using the ATSC system and the Open Cable system is connected to the DTV module 1 and the CableCARD is inserted into the PC card socket 13, in the memory state, that is the initial state of the CableCARD, the buffers 34 and 35 are turned off, and the terminal TS1_CLK of the decoder 18 is not connected to the PC card socket 13. In addition, the buffer 37 is turned on, and the buffer 42 is turned off. At this time, the terminals CPU_A [10:5] of the CPU 19 are connected to the terminals A [9:4] of the PC card socket 13 via the buffer 37. In addition, the buffer 39 is turned on, and at this time, the terminal CPU_A [15] of the CPU 19 is connected to the A [14] of the PC card socket 13 via the buffer 39. Further, the buffer 40 is turned on so as to output the address signals and the data signals from the CPU 19 to the PC card socket 13.

In a so-called CableCARD state, in which the CableCARD is changed to the operating state while the CableCARD is inserted into the PC card socket 13, the buffer 34 is turned off, and the buffer 35 is turned on. At this time, the terminal A [14] of the PC card socket 13 is connected to the terminal TS1_CLK of the CPU 19 via the buffer 35, so as to output a clock signal from the PC card socket 13 to the decoder 18 as the TS1_CLK. In addition, the buffers 37 and 39 are turned off, and at hit time, the terminal CPU_A [15] of the CPU 19 is not connected to the terminal A [14] of the PC card socket 13, and the terminals CPU_A [10:5] of the CPU 19 are not connected to the terminals A [9:4] of the PC card socket 13. Further, the buffers 42 and 43 are turned on, and the DRX, CRX and CTX signals, which are the control signals from the demodulator 12, are outputted to the terminals A [9,8,4] of the PC card socket 13 via the buffer 42. In addition, the QTX, ETX and ITX signals, which are the control signals from the terminals A [7,6,5] of the PC card socket 13, are outputted to the demodulator 12 via the buffer 43.

Next, control of the power-supply voltages supplied to the respective buffers 37 to 41 and control of the power-supply voltage supplied to the power-supply terminal Vcc of the PC card socket 13, which are executed by the CPU 19, are described with reference to FIG. 14. FIG. 14 shows a table of power-supply voltages supplied to the buffers 33 to 43 and the PC card shown in FIG. 6 in the system shown in FIG. 11 when the CA interface circuit 3 of FIG. 6 is used. Namely, FIG. 14 shows settings of the power-supply voltage switch 31 relative to the types of the motherboards 201 connected to the DTV module 1 and the types and states of the CA modules 14 inserted into the PC card socket 13. In FIG. 14, the power-supply voltages outputted from the power-supply voltage switch 31 are shown.

Referring to FIG. 14, when the motherboard 201 for Japan using the ISDB-T system is connected to the DTV module 1 or the CA module 14 is not inserted, the power-supply voltage of 3.3 V is supplied. In addition, when the motherboard 201 for Europe using the DVB-T system is connected to the DTV module 1, the power-supply voltage of 5 V is supplied. When the motherboard 201 for U.S.A. using the ATSC system and the Open Cable system are connected to the DTV module 1, and the CableCARD is inserted into the PC card socket 13, the power-supply voltage of 3.3 V is supplied.

According to the system configuration and buffer control in the CA interface circuit 3 according to the second preferred embodiment configured as described above, the electrical specifications between the decoder LSI 2 and the PC card socket 13, such as the connection and the voltage level in the connection can be appropriately set, when the CI card or the CableCARD is inserted or not inserted into the PC card socket 13. In addition, when any one of the motherboard 201 for Japan using the ISDB-T system, motherboard 201 for Europe using the DVB-T system and motherboard 201 for U.S.A. using the ATSC system and the Open Cable system is connected to the DTV module 1, the electrical specifications between the decoder LSI 2 and the PC card socket 13, such as the connection and the voltage level in the connection can be appropriately set. In addition, in the second preferred embodiment, by limiting a method of using the digital television receiver employed by a user to such a manner that the user turns off the power supply of the digital television receiver before the time when he inserts or removes the CI card or the CableCARD into or from the PC card socket 13, the control operation of the CPU 19 can be simplified. Concretely speaking, there is a possible method, in which a setting control of the electrical specifications between the decoder LSI 2 and the PC card socket 13 when the CI card or the CableCARD is inserted or not inserted into the PC card socket 13 is omitted, and the setting control of the electrical specifications between the decoder LSI 2 and the PC card socket 13 is executed only based on the type of the motherboard. The method can be realized, because the CA modules for the respective countries and areas are defined and determined according to the broadcasting systems.

Further, a control of the decoder 18 by the CPU 19 is described below. When the motherboard 201 for Japan using the ISDB-T system is connected to the DTV module 1, the decoding processing is executed on the MPEG-2_TS signal inputted from the demodulator 12, using the decoding method conforming to the ISDB-T system, so as to convert the MPEG-2_TS signal into the video signal and audio signal. In addition, when the motherboard 201 for Europe using the DVB-T system is connected to the DTV module 1, the decoding processing is executed on the MPEG-2_TS signal inputted from the demodulator 12, using the decoding method conforming to the DVB-T system, so as to convert the MPEG-2_TS signal into the video signal and audio signal. Further, when the motherboard 201 for U.S.A. using the ATSC system and the Open Cable system is connected to the DTV module 1, the decoding processing is executed on the MPEG-2_TS signal inputted from the demodulator 12, using the decoding method conforming to the ATSC system, so as to convert the MPEG-2_TS signal into the video signal and audio signal.

Third Preferred Embodiment

Figure 15:
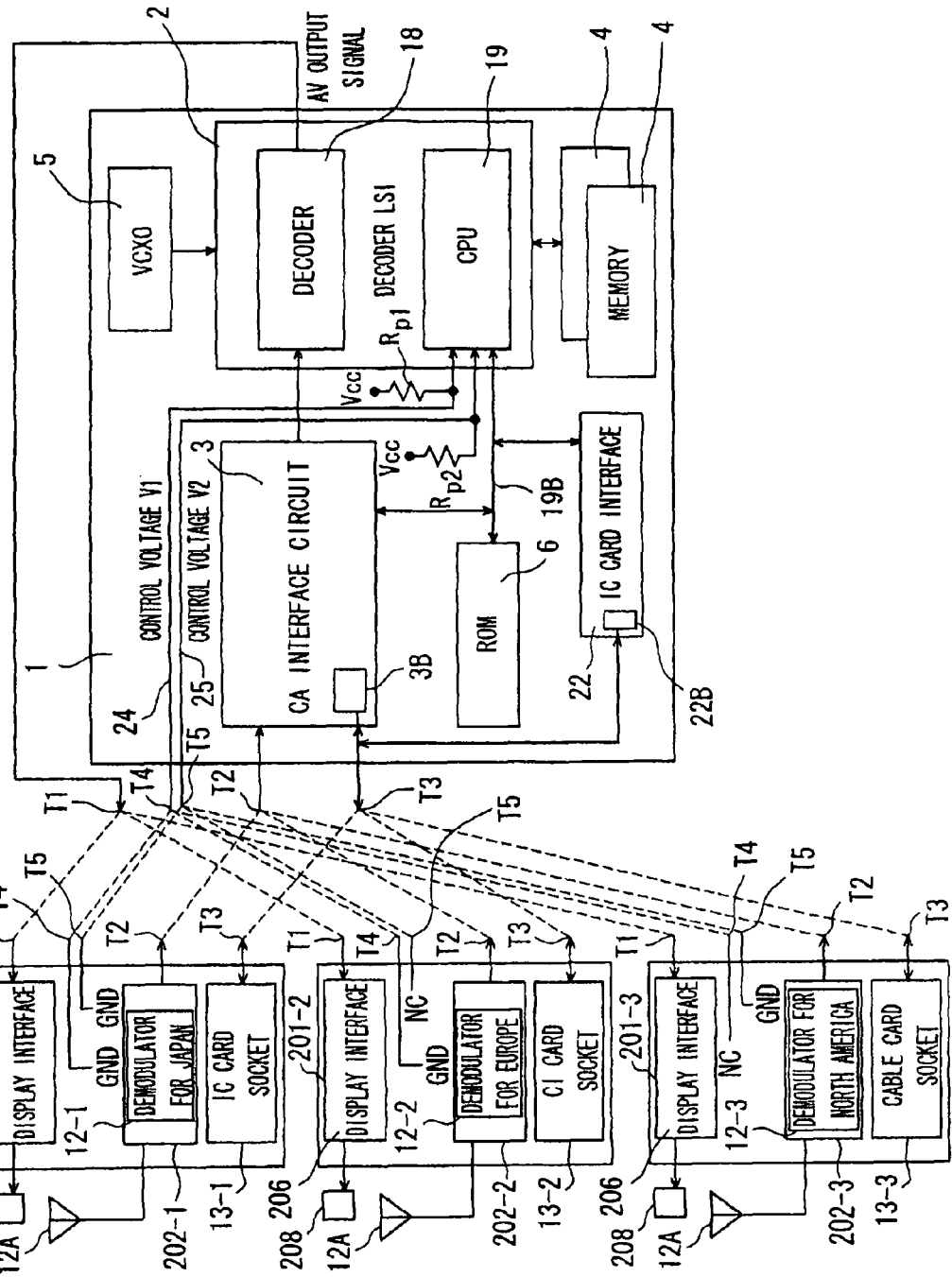
FIG. 15 is a block diagram showing a configuration of a system according to a third preferred embodiment of the present invention including the DTV module 1 and motherboards 201-1, 201-2 and 201-3 for respective countries connected to the DTV module 1.

FIG. 15 is a block diagram showing a configuration of a system according to a third preferred embodiment of the present invention including the DTV module 1 and motherboards 201-1, 201-2 and 201-3 for respective countries connected to the DTV module 1. The third preferred embodiment is a modified preferred embodiment of the second preferred embodiment, and differences between the present preferred embodiment and the second preferred embodiment are described below. The DTV module 1 according to the third preferred embodiment is characterized by being capable of connecting to any of the three motherboards 201-1, 201-2 and 201-3. In addition, in the DTV module 1, there is such a characteristic that the IC card interface 22 and the CA interface circuit 3 are integrated and connected to a common connection terminal T3.

Referring to FIG. 15, a connection between the connection terminal T3 and the CA interface circuit 3 a connection between the connection terminal T3 and the IC card interface 22 are described below. A buffer 22B is provided to the connection-terminal-T3 side of the IC card interface 22, and a buffer 3B is provided to the connection-terminal-T3 side of the CA interface circuit 3. In this case, the buffers 3B and 22B are controlled to be turned on and off by the CPU 19. The connection-terminal-T3 sides of the buffers 3B and 22B are connected to the connection terminal T3.

When the motherboard 201-1 for Japan using the ISDB-T system described with reference to FIG. 13 is connected, the CPU 19 turns on the buffer 22B, and turns off the buffer 3B. At this time, electrical specifications of the connection terminal T3 becomes such an electrical specifications conforming to a system using the IC card and being determined by the IC card interface 22. On the other hand, when the motherboard 201-2 for Europe using the CI card or the motherboard 201-3 for North America using the CableCARD are connected, the CPU 19 turns off the buffer 22B, and turns on the buffer 3B. At this time, the electrical specifications of the connection terminal T3 becomes such an electrical specifications conforming to a system using the CableCARD or the CI card and being determined by the CA interface circuit 3. By the above-described control, the IC card interface 22 shares the connection terminal T3 with the CA interface circuit 3. Namely, when the motherboard 201-1 is connected to the DTV module 1, an IC card socket 13-1 and the IC card interface 22 are connected to each other, so that the IC card interface 22 operates. In addition, when the motherboard 201-2 or 201-3 is connected to the DTV module 1, an CI card socket 13-2 or a CableCARD socket 13-3 is connected to the CA interface circuit 3, so that the CA interface circuit 3 operates.

Further, the present preferred embodiment has such a characteristic that connection terminals T1 to T5 of the DTV module 1 are divided into groups according to uses thereof and connected to the respective motherboards 201-1, 201-2 and 201-3 using common specifications. Concretely speaking, the connection terminals T1 to T5 are divided into the groups as follows.

(a) the connection terminal T1 for video signal and audio signal outputted from the decoder 18 and inputted to the display drive circuit 208 via the display interface 206;

(b) the connection terminals T4 and T5 for the control voltages V1 and V2 for inputting information on the classification data used to identify the types of the motherboards 201-1, 201-2 and 201-3 to the CPU 19;

(c) the connection terminal T2 which is connected to demodulators 12-1, 12-2 and 12-3 for use in the respective shipping destinations of the respective countries and areas so as to input the MPEG-2_TS signal from the demodulators 12-1, 12-2 and 12-3 to the CA interface circuit 3; and (d) the connection terminal T3 for input and output signals of a socket which is connected to the IC card socket 13-1, CI card socket 13-2 and CableCARD socket 13-3 connected to the respective CA modules 14.

In this case, the connection terminal T3 is connected to the CA interface circuit 3 or the IC card interface 22 via the buffer 3B or the buffer 22B as described above.

Referring to FIG. 15, the motherboard 201-1 for Japan includes the display interface 206, a front-end circuit 202-1 including a tuner (not shown) connected to the antenna 12A and the demodulator 12-1 for Japan, the IC card socket 13-1, and a circuit for outputting the control voltages V1 and V2 each having an electric potential of a ground conductor. When the DTV module 1 and the motherboard 201-1 for Japan are connected to each other, the CPU 19 reads the control voltages V1 and V2 and recognizes that the motherboard 201-1 for Japan is connected thereto and that the digital television signal conforming to the ISDB-T system is inputted thereto. Then, the CPU 19 sets the decoder 18 so that the decoder 18 executes the decoding processings conforming to the ISDB-T system on the MPEG-2_TS signal inputted from the demodulator 12-1 for Japan via the connection terminal T2, so as to convert the MPEG-2_TS signal into the video signal and audio signal. In addition, the CPU 19 connects the IC card socket 13-1 to the IC card interface 22 via the connection terminal T3 and the buffer 22B as described above. In this case, the display interface 206 receives the video signal and audio signal outputted from the decoder 18 of the DTV module 1 via the connection terminal T1, executes a predetermined interface processing on received video signal and audio signal, and thereafter outputs resultant video signal and audio signal to the display 204D via the display drive circuit 208.

In addition, the motherboard 201-2 for Europe includes the display interface 206, a front-end circuit 202-2 including a tuner (not shown) connected to the antenna 12A and the demodulator 12-2 for Europe, the CI card socket 13-2, and a circuit for outputting the control voltage V1, which has the electric potential of the ground conductor, and the control voltage V2, which is not connected thereto and has the power-supply voltage Vcc of the DTV-module-1 side. When the DTV module 1 and the motherboard 201-2 for Europe are connected to each other, the CPU 19 reads the control voltages V1 and V2 and recognizes that the motherboard 201-2 for Europe is connected thereto and that the digital television signal conforming to the DVB-T system is inputted thereto. Then, the CPU 19 sets the decoder 18 so that the decoder 18 executes the decoding processings conforming to the DVB-T system on the MPEG-2_TS signal inputted from the demodulator 12-2 for Europe via the connection terminal T2, so as to convert the MPEG-2_TS signal into the video signal and audio signal. In addition, as described above, the CPU 19 connects the CI card socket 13-2 to the CA interface circuit 3 via the connection terminal T3 and the buffer 3B, and sets the operation mode of the CA interface circuit 3 to such an operation mode conforming to the DVB-T system. In this case, the display interface 206 receives the video signal and audio signal outputted from the decoder 18 of the DTV module 1 via the connection terminal T1, executes a predetermined interface processing on received video signal and audio signal, and thereafter outputs resultant video signal and audio signal to the display 204D via the display drive circuit 208.

Further, the motherboard 201-3 for North America includes the display interface 206, a front-end circuit 202-3 including a tuner (not shown) connected to the antenna 12A and the demodulator 12-3 for North America, the Cable-CARD socket 13-3, and a circuit for outputting the control voltage V1 which is not connected and has the power-supply voltage Vcc on the DTV-module-1 side and the control voltage V2 which has the electric potential of the ground conductor. When the DTV module 1 and the motherboard 201-3 for North America are connected to each other, the CPU 19 reads the control voltages V1 and V2 and recognizes that the motherboard 201-3 for North America is connected thereto and that the digital television signal conforming to the ATSC system and the Open Cable system is inputted thereto. Then, the CPU 19 sets the decoder 18 so that the decoder 18 executes the decoding processings conforming to the ATSC system on the MPEG-2_TS signal inputted from the demodulator 12-3 for North America via the connection terminal T2, so as to convert the MPEG-2_TS signal into the video signal and audio signal. In addition, as described above, the CPU 19 connects the CableCARD socket 13-3 to the CA interface circuit 3 via the connection terminal T3 and the buffer 3B, and sets the operation mode of the CA interface circuit 3 to such an operation mode conforming to the open cable system. In this case, the display interface 206 receives the video signal and audio signal outputted from the decoder 18 of the DTV module 1 via the connection terminal T1, executes a predetermined interface processing on received video signal and audio signal, and thereafter outputs resultant video signal and audio signal to the display 204D via the display drive circuit 208.

FIGS. 16, 17 and 18 are diagrams showing a table of input and output signals and terminals of the CA module 14 including the IC card using the ISDB-T system in Japan, the CI card using the DVB-T system in Europe and the CableCARD using the Open Cable system in North America in the system according to the third preferred embodiment. As apparent from FIG. 16 to 18, the CA modules conforming to the respective systems can be commonly connected to the DTV module 1 via the connection terminal T3. In addition, it is apparent that the input and output signals and the terminals change according to the above-described respective systems.

FIG. 19 is a diagram showing a table of the video signal and audio signal outputted to the display drive circuit 208 via the display interface 206 shown in FIG. 15 and terminals. As apparent from FIG. 19, the display interfaces 206 of the respective motherboards 201-1, 201-2 and 201-3 can be commonly connected to the DTV module 1 via the connection terminal T1. In addition, it is apparent that signals and the terminals do not change according to the above-described respective systems.

FIG. 20 is a diagram showing a table of respective detailed signals of MPEG-2TS signals from the demodulators 12-1, 12-2 and 12-3 shown in FIG. 15 and terminals. As apparent from FIG. 20, the respective demodulators 12-1, 12-2 and 12-3 can be commonly connected to the DTV module 1 via the connection terminal T2. In addition, it is apparent that signals and the terminals do not change according to the above-described respective systems.

As described above, the connection terminal T3 connected to the respective CA modules 14 or the IC card via the sockets 13-1, 13-2 and 13-3 can change the electrical specifications thereof on the DTV-module-1 side according to the types of the motherboards 201-1, 201-2 and 201-3, or the CA modules 14 or the IC cards, however, the physical structure of the connection terminal T3 is the same. Each of the physical structures of the other connection terminals T1, T2, T4 and T5 is also the same relative to the motherboards 201-1, 201-2 and 201-3. Accordingly, it is possible to easily replace the motherboard which is connected to the DTV module 1 from one of the motherboards 201-1, 201-2 and 201-3 for use in the respective shipping destinations of the respective countries and areas to another one thereof.

As described above, the DTV module 1 including the CA interface circuit 3 of the present preferred embodiment can be directly connected to the front-end circuits 202-1, 202-2 and 202-3 of the respective countries and areas and the IC card, CI card or CableCARD, which is the CA module 14 of each of the respective markets. Accordingly, the DTV module 1 can be manufactured with ensuring the operation after the connection and with a reduced cost, size and weight, as compared the prior art. Accordingly, when the manufacturers of the digital television receiver uses the DTV module 1 according to the present invention, they can easily manufacture the digital television receivers for the respective countries, areas, and markets, by designing the motherboards 201-1, 201-2 and 201-3 mounting the front-end circuits 202-1, 202-2 and 202-3 for the respective countries and areas and sockets 13-1, 13-2 and 13-3 of the CA modules 14 for the respective markets, with a reduced cost, size and weight, as compared the prior art. In addition, when the manufacturers of the digital television receiver uses the DTV module 1 according to the present invention, they can easily manufacture the digital television receivers for the respective countries, areas, markets, and displays 204D, by designing the motherboards 201-1, 201-2 and 201-3 mounting the front-end circuits 202-1, 202-2 and 202-3 for the respective countries and areas, sockets 13-1, 13-2 and 13-3 of the CA modules 14 for the respective markets, and the display interfaces 206 of the respective displays 204D, with a reduced cost, size and weight, as compared the prior art.

Figure 22:
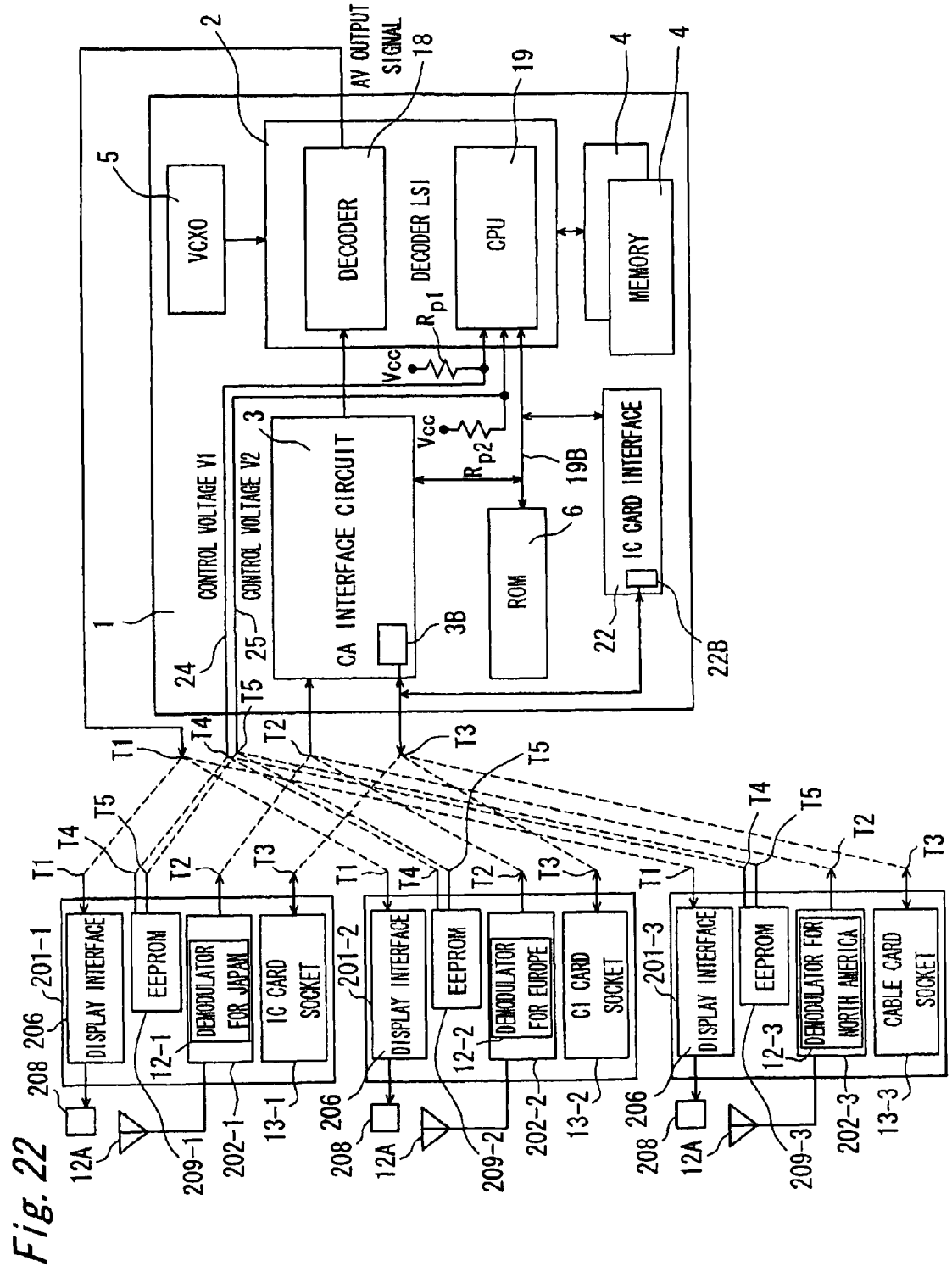
FIG. 22 is a block diagram showing a configuration of a system according to a modified preferred embodiment of the third preferred embodiment of the present invention including the DTV module 1 and motherboards 201-1, 201-2 and 201-3 for use in the respective countries connected to the DTV module 1.

FIG. 22 is a block diagram showing a configuration of a system according to a modified preferred embodiment of the third preferred embodiment of the present invention including the DTV module 1 and the motherboards 201-1, 201-2 and 201-3 for use in the respective countries connected to the DTV module 1. In the third preferred embodiment, in the motherboards 201-1, 201-2 and 201-3 for the respective countries, the type-identifying data signals for setting the types of the motherboards 201-1, 201-2 and 201-3 by connecting the signal lines 24 and 25 of the control voltages V1 and V2 to the ground conductor (GND) or not connecting (NC). However, the present invention is not limited to this. As shown in FIG. 22, EEPROMs 209-1, 209-2 and 209-3, which are non-volatile memories for memorizing setting data of the control voltages V1 and V2, may be mounted on the motherboards 201-1, 201-2 and 201-3. The CPU 19 may read out the classification data from the EEPROMs 209-1, 209-2 and 209-3, so as to generate type-identifying data signals and to detect the types of the motherboards 201-1, 201-2 and 201-3. In addition, because the types of the CA modules 14 inserted into the PC card socket 13 can be detected by the processing for detecting the insertion of the CA module which is shown in FIG. 9 and describe in the first preferred embodiment, the types of the motherboards 201-1, 201-2 and 201-3 for the respective countries may be detected based on a detection result.

In this case, the detections of the type of the CA module 14 and the coding systems may be carried using at least one of the methods according to the first preferred embodiment, second preferred embodiment, third preferred embodiment and modified preferred embodiment of the third preferred embodiment.

Fourth Preferred Embodiment

FIG. 21 is a block diagram showing a configuration of a system according to a fourth preferred embodiment of the present invention including the DTV module 1, motherboards 201-1, 201-2 and 201-3 for use in the respective countries connected to the DTV module 1, a network function expansion board 401 and a CATV modem function expansion board 411. The fourth preferred embodiment is a modified preferred embodiment of the third preferred embodiment. The fourth preferred embodiment is characterized by further including a connection terminal T6 connected to the bus 19B of the CPU 19, and by having such a configuration that the network function expansion board 401 or the CATV modem function expansion board 411 can be connected to the connection terminal T6. Differences between the present preferred embodiment and the third preferred embodiment are described below.

Referring to FIG. 21, the CPU 19 is connected to a communication controller 404 in the network function expansion board 401 or a cable modem 412 in the CATV modem function expansion board 411 via the bus 19B thereof and the connection terminal T6, and the CPU 19 communicates with the controller 404 or the cable modem 412 using signals such as the address signal and the data signal. A bridge circuit (not shown) including a PCI bus, for example, may be inserted on the bus-19B side of the connection terminal T6, so that the network function expansion board 401 or the CATV modem function expansion board 411 is connected to the PCI bus.

The network function expansion board 401 is connected to the DTV module 1 when a network-related function is added to the DTV module 1, and includes the communication controller 404, an Ethernet interface 402, and a hard disk drive 403. When the DTV module 1 is combined with the network function expansion board 401, the network-related function can be realized. For example, the network-related function is a function for providing a service such as a video on demand service in which a user downloads contents from a communication server and listen to and view downloaded contents by connecting the network function expansion board 401 to a broadband network such as an Internet.

The Ethernet interface 402 is connected to the network so as to transmit and receive a communication packet. Based on a control operation of the communication controller 404, the Ethernet interface 402 receives, for example, contents data including a plurality of packets constituting the contents, and thereafter stores received contents data in the hard disk drive 403. Based on an instruction signal from the CPU 19, the communication controller 404 reads out the contents data stored in the hard disk drive 403, and outputs read-out contents data to the CA interface circuit 3 and the decoder 18 via the connection terminal T6 and the bus 19B. Then, decoding and display processings are executed on the contents data, according to the control of the CPU 19. The contents data may be directly outputted to and stored in the memories 4 via the CPU 19, without temporally storing the contents data in the hard disk drive 403.

In addition, the CATV modem function expansion board 411 is connected to the DTV module 1 when a CATV modem function is added to the DTV module 1, and includes the cable modem 412. When the DTV module 1 is combined with the CATV modem function expansion board 411, the CATV modem function can be realized. For example, the CATV modem function is a function for providing a service in which the user downloads application software such as a game from a server connected to a head end of a CATV. The cable modem 412 is connected to the head end of the CATV so as to transmit and receive the communication packet.

In the present preferred embodiment, the function expansion board 401 or 411 is connected to the DTV module 1. However, the present invention is not limited to this. The function expansion board 401 or 411 may be connected to via the motherboards 201-1, 201-2 and 201-3. Namely, the connection terminal of the DTV module 1 for connecting the function expansion board 401 or 411 thereto is connected to the connection terminals of the motherboards 201-1, 201-2 and 201-3, and thereafter connected to the function expansion board 401 or 411.

The network-related function and CATV modem function are generally demanded in a high-end digital television receiver offered to a user desiring higher functions. With such a configuration in which the function expansion board 401 or 411 is connected to the DTV module 1, a low-end television receiver whose function is not expanded can easily be upgraded to the high-end television receiver whose function can be expanded. In addition, the function to be expanded can be easily selected, since the function expansion board 401 or 411 can be connected via the common connection terminal T6.

Countries and areas, in which services corresponding to the expansion of functions are provided, are known in advance. Accordingly, the CPU 19 can read predetermined control voltages for identifying the motherboards 201-1, 201-2 and 201-3, so as to determine whether or not the function is expanded in the respective shipping destinations. For example, when the services are provided in Japan, the CPU 19 can recognize that the motherboard 201-1 for Japan is connected to the DTV module 1, and permit the connection of the function expansion board. When the services are not provided in countries other than Japan, the CPU 19 can recognize that the motherboard 201-1 for Japan is not connected to the DTV module 1, and prohibit the connection of the function expansion board.

As described above, the DTV module 1 including the CA interface circuit 3 according to the present preferred embodiment has the same effects as in the first to third preferred embodiments, and further, can includes the network-related function by connecting the network function expansion board 401 thereto and the CATV modem function by connecting the CATV modem function expansion board 411 thereto. In addition, the physical and electrical structures of the connection terminals T6 are the same as each other. Accordingly, one of the function expansion boards 401 and 411 can be easily connected to and removed from the DTV module 1. Accordingly, when the manufacturers of the digital television receiver uses the DTV module 1 according to the present invention, they can easily manufacture the low-end and high-end digital television receivers for the respective areas, and markets, by designing the motherboards 401 and 402 mounting the front-end circuits 202-1, 202-2 and 202-3 for the respective areas and the respective sockets 13-1, 13-2 and 13-3 of the CA modules 14 for the respective markets, with a reduced cost, size and weight, as compared the prior art.

INDUSTRIAL APPLICABILITY

As described above in detail, when the DTV module according to the present invention is used, the digital television receivers for the respective countries, areas, markets, and display devices can be easily manufactured, and cost reduction can be realized through the mass production. In addition, because the digital television receiver can be reduced in size and weight, the DTV module according to the present invention can contribute to the popularization of the digital television receiver, by applying the DTV module according to the present invention to a mobile receiver, an in-vehicle receiver and the like. Further, the DTV module 1 is effective for the digital television receiver for receiving the digital television

The invention claimed is:

1. A digital television receiver module for use in a digital television receiver, wherein the digital television receiver module connects decoders of devices with front-end circuits and conditional access (CA) modules made differently for respective broadcast specifications, the digital television receiver module comprising:
a first connecting device having a plurality of terminals for electrically connecting to one external substrate among external substrates which receives digital television signals of broadcasting systems different from each other;
a first common terminal group commonly assigned in the first connecting device based on a predetermined terminal table, the first common terminal group connecting front-end circuits provided in the external substrates and that are compliant with the broadcasting systems;
a decoding device for executing a decoding processing on a digital television signal inputted from a demodulator provided on the external substrate via the first connecting device, so as to convert the digital television signal into a video signal and an audio signal, and for outputting the video signal and audio signal via the first connecting device;
a control device for controlling an operation of the digital television receiver module;
a second common terminal group commonly assigned in the first connecting device based on the predetermined terminal table, the second common terminal group connecting a plurality of types of CA modules having terminal specifications including input and output directions of one of signal types and signals different from each other; and
an interface device for executing input and output processing on a plurality of signals communicated among the CA modules, the decoding device and the control device,
wherein the interface device comprises at least one set of a first input buffer, a first output buffer, and a second input buffer, the first input buffer including an input terminal connected to one terminal of the second common terminal group, and an output terminal connected to the decoding device,
the first output buffer includes an input terminal connected to the control device, and an output terminal connected to one terminal of the second common terminal group, the second input buffer including an input terminal of another terminal of the second common terminal group and an output terminal connected to the decoding device, and
the control device controls the interface device by changing a signal type, input direction and output direction of the signal communicated via a terminal of the second common terminal group by controlling on-off states of the first input buffer, on-off states of the first output buffer, and on-off states of the second input buffer, based on the predetermined terminal table so as to conform to the terminal specifications of a connected CA module and in response to at least one of a broadcasting system of an inputted digital television signal and a type of the connected CA module, and based on a type-classifying data signal inputted from a memory mounted on the external substrate via the first connecting device.

2. The digital television receiver module as claimed in claim 1,
wherein the interface device outputs a digital television signal inputted from the demodulator to the decoding device and a CA module via the first connecting device.

3. The digital television receiver module as claimed in claim 1,
wherein, when a CA module is not connected to the control device via the first connecting device, the control device controls the interface device so that a detection signal from the CA module is outputted to the control device.

4. The digital television receiver module as claimed in claim 2,
wherein, when a first type CA module among the plurality of types of CA modules is connected to the control device via the first connecting device, the control device controls the interface device so that a digital television signal inputted from the connected CA module via the first connecting device is outputted to the decoding device.

5. The digital television receiver module as claimed in claim 4,
wherein the control device outputs a first power-supply voltage to the connected CA module via the first connecting device, and controls the interface device so that an address signal and a data signal from the control device are outputted to the connected CA module via the first connecting device on the first power-supply voltage.

6. The digital television receiver module as claimed in claim 4,
wherein the first type CA module is a CA module of a Common Interface.

7. The digital television receiver module as claimed in claim 2,
wherein, in such an initial state that a second type CA module among the plurality of types of CA modules is connected to the control device via the first connecting device, the control device controls the interface device, so that a second power-supply voltage is outputted to the connected CA module via the first connecting device, a digital television signal inputted from the connected CA module via the first connecting device is outputted to the decoding device, and an address signal and a data signal from the control device are outputted to the connected conditional CA module via the first connecting device on the second power-supply voltage.

8. The digital television receiver module as claimed in claim 7,
wherein, in such an operating state that is after the initial state that the second type CA module among the plurality of types of CA modules is connected to the control device via the first connecting device, the control device controls the interface device, so that a clock signal inputted from the connected CA module via the first connecting device is outputted to the decoding device, a control signal inputted from the demodulator via the first connecting device is outputted to the connected CA module via the first connecting device, and a control signal inputted from the connected CA module via the first connecting device is outputted to the demodulator via the first connecting device.

9. The digital television receiver module as claimed in claim 7,
wherein the second type CA module is a CA module of a cableCARD.

10. The digital television receiver module as claimed in claim 1, further comprising a further interface device for connecting a third type CA module to the interface device and the control device.

11. The digital television receiver module as claimed in claim 1,
wherein the third type CA module is a CA module of an IC card.

12. The digital television receiver module as claimed in claim 10, further comprising a device for selectively switching over between:
(a) a first state that the first connecting device is connected to the interface device; and
(b) a second state that the first connecting device is connected to the further interface device.

13. The digital television receiver module as claimed in claim 1,
wherein the digital television receiver module comprises a substrate having a plurality of layers, and
wherein a capacitor layer substrate on which a plurality of thin-film capacitors are mounted and a resistance layer substrate on which a plurality of thin-film resistances are mounted, are sandwiched between a first signal wiring layer substrate and a second signal wiring layer substrate.

14. The digital television receiver module as claimed in claim 1,
wherein, via the first connecting device, the digital television receiver module is connectable to one of the following:
(a) a first type external substrate conforming to a first broadcasting system, and comprising a first type demodulator and a second connecting device which connect the first type CA module thereto; and
(b) a second type external substrate conforming to a second broadcasting system, and comprising a second type demodulator and a second connecting device which connect the second type CA module thereto.

15. The digital television receiver module as claimed in claim 1,
wherein the control device detects a type of the external substrate and a broadcasting system of the inputted digital television signal, based on a type-identifying data signal inputted from the external substrate via the first connecting device, and
wherein, based on a detected broadcasting system, the control device controls an operation of the decoding device and switches over among the types of the signals communicated via the first connecting device so as to control the interface device.

16. The digital television receiver module as claimed in claim 15,
wherein the type-identifying data signal is generated so as to differ depending on the type of the external substrate, by connecting or not connecting the external substrate to a ground conductor.

17. The digital television receiver module as claimed in claim 15,
wherein the type-identifying data signal is a signal of readout data which is obtained by reading out data stored in a memory mounted on the external substrate so as to differ depending on the type of the external substrate.

18. The digital television receiver module as claimed in claim 17,
wherein the broadcasting system includes at least one of a digital video broadcasting-terrestrial (DVB-T) system, an advanced television systems committee (ATSC) system and an integrated services digital broadcasting-terrestrial (ISDB-T) system.

19. The digital television receiver module as claimed in claim 1, further comprising a third connecting device for connecting a plurality of types of function expansion substrates, the plurality of types of function expansion substrates having functions different from each other to expand a function of the digital television receiver module.

20. The digital television receiver module as claimed in claim 19,
wherein the function expansion substrates include at least one of a network function expansion board for connection to a network, and a cable television (CATV) modem function expansion board for connection to a head end of a CATV.

* * * * *